United States Patent
Cairns et al.

[15] 3,673,218
[45] June 27, 1972

[54] BICHROMONYL COMPOUNDS

[72] Inventors: Hugh Cairns; Peter Bennett Johnson, both of Loughborough, England

[73] Assignee: Fisons Pharmaceuticals Limited, Loughborough, England

[22] Filed: Oct. 28, 1969

[21] Appl. No.: 871,972

[30] Foreign Application Priority Data

Oct. 30, 1968    Great Britain......................51,421/68

[52] U.S. Cl..........................260/345.2, 260/345.5, 424/283, 260/296 B, 260/297 B, 260/294.8 G, 260/295 F, 260/293.58, 260/613 R, 260/609 R, 260/576, 260/619 R, 260/620, 260/296 AE, 260/297 R, 260/514 R, 260/469, 260/470, 260/471 R, 260/473 R, 260/473 S, 260/475 R, 260/475 SC
[51] Int. Cl. ..............................................C07d 7/34
[58] Field of Search............260/345.2, 345.5, 296 B, 297 B, 260/294.8 G, 295 F, 293.58

[56] References Cited

UNITED STATES PATENTS 3,419,578   12/1968   Fitzmaurice et al. ...............260/345.2
3,519,652   7/1970   Fitzmaurice et al. ...............260/345.2

Primary Examiner—John M. Ford
Attorney—Wenderoth, Lind & Ponack

[57] ABSTRACT

Compounds of the formula

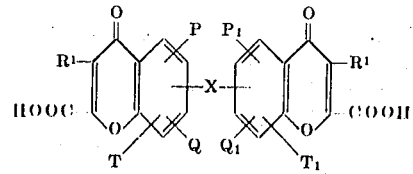

in which P to $T_1$ are hydrogen, alkyl, alkoxy, alkenyl, alkenyloxy, substituted alkyl, substituted alkoxy, substituted alkenyl, substituted alkenyloxy, amino, substituted amino aminoalkoxy, substituted aminoalkoxy, nitro, halo, hydroxy, or benzyloxy; the $R^1$ groups are hydrogen, substituted or unsubstituted alkyl, alkoxy or aryl; and X is a carbon - carbon bond or a single atom, which may be substituted, through which the chromone nuclei are linked, and pharmaceutically acceptable derivatives thereof, are indicated for use in the treatment of 'extrinsic' allergic asthma.

34 Claims, No Drawings

BICHROMONYL COMPOUNDS

The present invention relates to novel compounds, their preparation and use.

The invention provides as novel compounds, compounds of the formula

I
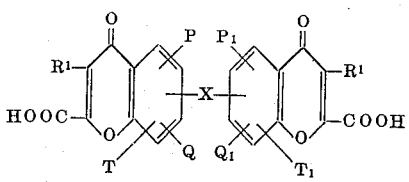

and functional derivatives thereof wherein $P$, $Q$, $T$, $P_1$, $Q_1$ and $T_1$ may be the same or different and each may be selected from hydrogen and substituents other than hydrogen; the $R^1$ groups may be the same or different and each is selected from hydrogen, a substituted or unsubstituted alkyl or alkoxy group containing from one to ten carbon atoms and a substituted or unsubstituted aryl group; and —X— is a carbon to carbon bond or a single atom through which the chromone nuclei are linked, which single atom may carry substituents which do not form part of the linkage itself between the two chromone nuclei.

The —X— atom may be an oxygen or sulphur atom, may be a substituted sulphur or nitrogen atom or may be a methylene group or a substituted methylene group. The substituents may be linked to the linkage atom by single bonds, as with an hydroxymethylene linkage, or by double bonds, as with a carbonyl group linkage. Specific examples of such substituted atoms are the group —SO—, —SO$_2$—,

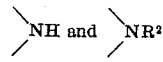

groups [where $R^2$ is an alkyl, alkenyl, alkoxy, aralkyl, aryl, acyl, hydroxy, carboxy or a carbocyclic or heterocyclic ring or such groups or rings carrying further substituents such as hydroxy, halogen, alkyl, alkoxy or aryl group] such as an

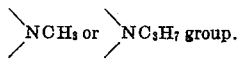

Where —X— is a substituted methylene group, it may have the formula

wherein each $R^3$ may be the same or different and is an hydrogen; an hydroxy; an halogen; an alkyl, alkenyl or alkynyl group which may or may not have any carbon atom therein replaced by a group such as an oxygen, sulphur or nitrogen atom or a carbonyl group or an amide or ester linkage, which groups may carry further substituents such as halogen, hydroxy, carboxy or alkoxy groups; a carboxylic acid group (including salts, esters and amides thereof); an aryl, aralkyl, aryloxy or aralkoxy group which may carry any of the substituents listed above; and an heterocyclic or carbocyclic ring which may carry any of the substituents listed above. The methylene group may also have substituents linked thereto by double bonds as is the case with the groups

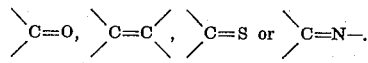

Preferred forms of —X— linkage are those wherein the —X— atom or substituted atom is

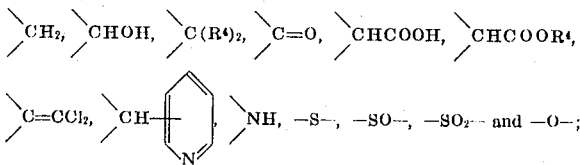

$R^4$ being an alkyl group, notably a lower alkyl group such as a methyl group, ethyl, propyl or pentyl group.

The term lower is used herein to mean a group containing from one to six carbon atoms.

As indicated above, the —X— linkage may be merely a carbon to carbon bond between the chromone nuclei and this form of linkage is particularly preferred.

The linking bond or atom —X— may link the two chromone nuclei in any of the free positions thereon, i.e. in the 5, 6, 7 or 8 positions. It is usually preferred that the linkage be between the same positions on the chromone nuclei, e.g. between the 6 and 6' or the 7 and 7' positions.

The $P$, $Q$, $T$, $P_1$, $Q_1$ and $T_1$ substituents need not all be the same and may be selected from a number of groups. Examples of suitable groups include alkyl groups, notably those containing from one to eight carbon atoms, which may be straight or branched (such as methyl, ethyl or isopropyl groups) and which may carry one or more substituents, such as hydroxy, alkoxy or halo groups, e.g. an hydroxymethyl, hydroxy propyl, ethoxyethyl, or chloromethyl group; alkoxy groups corresponding to such alkyl groups, e.g. an isopropoxy, an hydroxypropoxy group or an ethoxyethoxy group; alkenyl or alkenyloxy groups corresponding to such alkyl or alkoxy groups; amino groups which may carry substituents, such as a mono- or di-lower alkyl amino group; aminoalkoxy groups which may carry substituents such as a di-lower alkylamino lower alkoxy group; a nitro group; an hydroxy group; or an halogen atom. Specific examples of suitable groups are chloro, bromo, iodo, hydroxy, acetoxy, nitro, methyl, ethyl, propyl, butyl, tert. butyl, allyl, 1-methylallyl, prop-1-enyl, methoxy, ethoxy, propoxy, butoxy, allyloxy, but-3-enoxy, acetyl, hydroxymethyl, ethoxymethyl, chloromethyl, 2-chloroethoxy, 2-iodoethoxy, 2-hydroxyethoxy, 2-hydroxypropoxy, 3-hydroxypropoxy, 2,3-dihydroxypropoxy, 2-hydroxybutoxy, 3-methylbutoxy, 2-ethoxyethoxy, 3-methoxy-2-hydroxypropoxy, 3-butoxy-2-hydroxypropoxy, diethylaminoethoxy, aminoethylamino and acetylamino. It is, however, preferred that $P$, $Q$, $T$, $P_1$, $Q_1$ and $T_1$ all be hydrogen.

$R^1$ may have any of the values specified above, particularly hydrogen; a loweralkyl group, such as a methyl, ethyl, propyl, or pentyl group; a lower alkoxy group corresponding to such alkyl groups; or an aryl group such as a phenyl group. It is preferred that both $R^1$ groups be hydrogen.

It will be appreciated that certain of the above values of $P$, $Q$, $T$, $P_1$, $Q_1$, $T_1$ and $R^1$ may include groups which could be detrimentally affected by the reactants and/or reactant conditions used to introduce other groups into the molecule. In such cases the susceptible group may be blocked or shielded, for example by alkylation, acetylation or benzylation for all or part of the processes during which the compounds of formula I are prepared; or by the blocking of the reactive site by a removable group, such as a cyano or nitro group, which may be removed at the end of a preparative process to permit introduction of the desired group or hydrogen atom in a final stage. The values for the $P$, $Q$, $T$, $P_1$, $Q_1$ and $T_1$ and $R^1$ groups given herein are therefore to be construed to include, where permissible, a shielded or blocked precursor or derivative of the desired value for the substituent. The presence of a blocking group on the benzene ring may have the added advantages that it may assist linkage of that ring to another and may also ensure that the formation of the desired

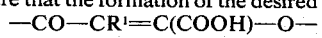

chain occurs between the correct positions on the benzene ring and not on others.

Particularly preferred compounds of the present invention are those of the general formula

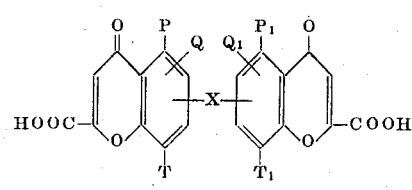

and functional derivatives thereof (notably the sodium and ammonium salts; alkyl, dialkylamino-alkyl and piperidinoalkyl esters where the alkyl groups have from one to six carbon atoms, e.g. ethyl groups; and amides derived from ammonia, aminoacids such as glycine and dialkylaminoalkyl amines, e.g. diethylaminoethylmine) wherein X is a carbon to carbon bond, a

or substituted

group, an —S—, —SO—, —SO$_2$— or

group linking the 6 and 6' or 7 and 7' positions of the two chromone nuclei; and P, Q, T, $P_1$, $Q_1$ and $T_1$ may be the same or different and each is selected from hydrogen, hydroxy, halogen and lower alkyl or alkoxy groups, which groups may carry one or more hydroxyl, alkoxy or dialkylamino groups as substituents. It is especially preferred that —X— be a carbon to carbon bond or an —S— atom linking the 6 and 6' positions of the chromone nuclei and that P-$T_1$ are all hydrogen.

Functional derivatives of the compounds according to the invention include salts, notably water-soluble salts; esters and amides of one or more of the carboxylic acid functions present and derivatives of any other functional groups present.

Salts of the compounds which may be mentioned are salts with physiologically acceptable cations, for example, ammonium salts; metal salts, such as alkali-metal salts (e.g. sodium potassium and lithium salts) and alkaline-earth metal salts (e.g. magnesium and calcium salts); and salts with organic bases, e.g. amine salts derived from mono-, di- or tri-lower alkyl or lower alkanolamines, (such as triethanolamine or triethylamine) and salts with heterocyclic amines such as piperidine or pyridine.

Esters which may be mentioned include simple alkyl esters derived from alcohols containing from one to ten carbon atoms (e.g. a methyl, ethyl, propyl, or pentyl ester) and alkylaminoalkyl esters, such as those of the general formula —COO—R''—NR'''R'''' wherein R'' is a branched or straight alkylene chain (e.g. one containing from one to four carbon atoms such as a methylene, ethylene, propylene, isopropylene or tert. butylene group); and R''' and R'''' may be the same or different and each is selected from hydrogen or an alkyl group (e.g. a lower alkyl group such as a methyl, ethyl, propyl or butyl group) or together with the nitrogen atom form an heterocyclic ring such as a piperidine or morpholine ring. Examples of such basic esters are diethylaminoethyl and piperidinoethyl esters. The basic esters may be in the form of an acid addition salt thereof with a physiologically acceptable acid, e.g. hydrochloric acid.

Amides which may be mentioned include simple amides derived from ammonia or primary or secondary aliphatic or aromatic amines, such as mono- or di-lower alkyl amines (for example diethylamine), aniline or a mono-alkylaniline such as methyl aniline; and more complex amides derived from amino acids such as glycine, i.e. amides of the formula —CONR'—R'' —COOH, or salts and esters thereof, and from mono- or bis-(dialkylamino-alkyl) amines, i.e. amides of the formula — CONR'—R''—R'''R'''' wherein R' is hydrogen or an alkyl group (e.g. a lower alkyl group such as a methyl, ethyl, propyl or butyl group) and R'', R''' and R'''' have the values given above. The amides may exist in the form of an acid salt thereof, e.g. an hydrochloride.

Other functional groups in the molecule may be in the form of derivatives thereof. Thus, acidic groups other than the 2-carboxylic acid group may be in the form of a salt, ester or amide as described above, or may be in the form of an ureide, or hydrazide. Hydroxyl groups may be in the form of an acylated or benzylated derivative thereof, an ester or acetal group or in the form of an alkali-metal derivative thereof. Carbonyl groups may be in the form of an oxime. Amino groups may be in the form of a salt thereof with a pharmaceutically acceptable acid, such as hydrochloric, citric, succinic or oxalic acid, or in the form of a quaternary ammonium salt.

The new compounds of the invention have been shown to inhibit the release of toxic products which arise from the combination of certain types of antibody and specific antigen, e.g. the combination of reaginic antibody with specific antigen. In man, both subjective and objective changes which result from the inhalation of specific antigen by sensitized subjects may be markedly inhibited by administration of the new compounds. Thus, the new compounds are indicated for use in the treatment of 'extrinsic' allergic asthma. The new compounds may also be of value in the treatment of so-called 'intrinsic' asthma (in which no sensitivity to extrinsic antigen can be demonstrated) and in the treatment of other conditions in which antigen-antibody reactions are responsible for disease, for example, hay fever, urticaria and auto-immune diseases.

According to a further feature of the invention, therefore, there is provided a pharmaceutical composition comprising a compound of formula I, or a derivative thereof, preferably in the form of a salt, in association with a pharmaceutically acceptable carrier or diluent. There is also provided a process for the manufacture of such a pharmaceutical composition which comprises mixing a compound of formula I with a carrier or diluent.

The nature of the composition and the pharmaceutically acceptable carrier or diluent will, of course, depend upon the desired mode of administration, which may be for example, orally; by inhalation; parenterally; or by topical application.

The composition may be formulated in the conventional manner with the customary ingredients. For example the compositions may be put up as aqueous solutions or suspensions, as powders or in tablet, cream, lotion or syrup form.

The compositions of the invention generally comprise a minor proportion of the compound of formula I and a major proportion of carrier or diluent. Thus, for example, aqueous solutions for administration by means of a conventional nebulizer may contain up to about 10 percent by weight of the active ingredient in sterile water; and compositions for dispensing from a pressurized container comprising suspensions or solutions in liquefied propellants will contain, for example, about 0.2-5 percent by weight of the active ingredient.

The compounds of formula I are preferably administered by inhalation, notably in the treatment of allergic asthma. For such use, the compounds of formula I, preferably in the form of a salt such as the sodium salt, are dissolved or suspended in water and may be applied by means of a conventional nebulizer. However the administration of medicaments by means of a pressurized dispensing container, i.e. an aerosol dispenser, is an alternative to nebulizer administration. For administration from a aerosol dispenser, the medicament is dissolved or suspended in a liquefied propellant medium. The propellants for present use may be any of those which are conventionally used in formulations for dispensing from pressurized containers. For example they may be of the halogenated hydrocarbon type such as fluoro- or fluorohalo- hydrocabons, e.g. trichloromonofluoromethane, dichlorodifluoromethane, dichlorotetrafluoroethane, monochlorotrifluoromethane, monochlorodifluoromethane and mixtures of any of these together or with other propellants. Typical suitable propellants are those disclosed in, for example, U.S. Pat. No. 2868691 and sold under the trade name of Freon. It is preferred that the propellant should be of low toxicity, especially where the composition is to be ingested, e.g. inhaled, by the user. It is therefore preferred to use difluorodichloromethane, dichlorotetrafluoroethane or mixtures thereof. Where the medicament is not soluble in the propellant, it may be necessary to add a surface-active agent to the composition in order to suspend the medicament in the propellant medium, and such surface-active agents may be any of those commonly used for this purpose, such as nonionic surface-active agents. However, we prefer to use the anionic dialkyl sulphosuccinate or alkyl benzene sulphonate surface-active agents. The use of such surface-active agents and the advantages which stem therefrom are more fully described in British Pat. Spec. No. 1063512.

The compositions of the invention may also be administered in the form of powders by means of an insufflator device, such as that described in British Pat. Spec. No. 1122284. In order to improve the properties of the powder, it may be desired to modify the surface characteristics of the powder particles, for example, by coating them with a pharmaceutically acceptable material such as sodium stearate. In addition, fine particle sized powders of the active ingredients may be mixed with a coarser diluent material, such as lactose, which may be present in a smaller, equal, or greater amount than the active ingredients, for example in from 50 to 150 percent by weight of the compound of formula I and such other active ingredients as may be present.

Whilst the inhalation of medicament has been described above with particular reference to oral administration, it will be appreciated that it may be desirable to administer the medicament nasally. The term inhalation is therefore used herein to denote, where the context permits, both oral and nasal administration.

The composition of the invention may also be administered as tablets, syrups and the like or by intradermal or intravenous injection in the conventional manner.

The compounds of formula I may also find use in the treatment of eye conditions, for example that associated with hayfever. For such use the compound of formula I may be used in the form of an eye drop as an aqueous solution containing about 2 percent of the compound and a preservative.

In addition to the internal administration, the compounds of formula I find use in compositions for topical application, e.g. as creams, lotions or pastes for use in dermatological treatments.

In addition to the compound of formula I and the ingredients required to present the compound in a form suitable for the selected mode of administration, other active ingredients may be present in the composition of the invention. Thus, in compositions for administration by inhalation, it may be beneficial to include a brochodilator. Any bronchodilator may, within reason, be used. Suitable bronchodilators include isoprenaline, adrenaline, orciprenaline, isoetharine and derivatives thereof, particularly the salts thereof. The use of isoprenaline sulphate is preferred. The amount of bronchodilator used will vary over a broad range, depending, inter alia, upon the nature and activity of the bronchodilator and the compound of formula I used. However, the use of a minor proportion (i.e. less than 50 percent by weight) of the bronchodilator is preferred. The use of from 0.1 to 10 percent by weight of the bronchodilator based on the weight of the compound of formula I is particularly preferred.

From a further aspect, the invention therefore provides a composition which comprises a compound of formula I or a derivative thereof in admixture with a bronchodilator, which latter is preferably present in less than 50 percent, especially 0.1 to 10 percent by weight of the former.

As indicated above, the compounds of formula I are indicated for use in inhibiting the effects of antibody-antigen reactions. In such treatment, the compound or composition of the invention is administered by the chosen method to the site of the antibody-antigen reaction in the therapeutically effective amount. The treatment may be one which requires repeated dosages of the medicament at regular intervals. The amount and frequency of medicament administered will depend upon many factors and no concise dosage rate or regimen can be generally stated. However, as a general guide, where the compounds are administered by inhalation to a patent suffering from acute allergic asthma, therapeutically useful results may be achieved when the compounds are administered at a dosage of 0.1 to 50 mgs. Where the compounds are administered by the oral route, larger dosages may be given.

The invention thus also provides a method for inhibiting the effects of an antibody-antigen reaction which comprises the prior or subsequent application to the known or expected area of the antibody-antigen reaction mechanism of a therapeutically effective amount of a compound of formula I or a derivative thereof.

The compounds of formula I may be prepared by a variety of methods. These will usually involve the steps of introducing the substituents $P$, $Q$, $T$, $P_1$, $Q_1$ and $T_1$, the formation of the pyrone rings on each 'half' of the molecule and the linkage of the two 'halves' of the molecule. These steps may take place in any order where the nature of the reaction conditions and reactants permits. Thus, some but not all of the substituents may be introduced into each of the benzene rings; these benzene rings may then be converted to chromone nuclei; these chromone nuclei then linked; and finally the last of the substituents introduced.

It will be appreciated that the compounds of formula I possess two pyrone rings and that these may be the same or different. Each of these rings may be introduced in separate stages by different or similar methods or may be introduced together in a single reaction stage. It is also possible to introduce in separate stages a precursor of one of the desired rings, for example a chain —CO—CH$_2$—CH(COOH)—O—, by one method, to introduce the same or another precursor for the other ring, e.g. a chain —COCH(CH$_3$)—CH(COOH)—O—, by a different method; and then to convert the two precursors into the desired rings in a final common reaction stage, e.g. dehydrogenation. For convenience the preparation of the compounds of formula I will be described in terms of the formation of only one of the two desired pyrone rings. The other ring may be present initially, be formed during the formation of the first ring, or be introduced later by the same or a different process. Where both rings are to be introduced one after another it may be necessary to shield or block the sites at which the second ring is to be introduced. Such shielding or blocking may be achieved by conventional methods.

Furthermore the two chromone moieties which are linked via the —X— linkage may each be formed before or after the linkage of the two benzene rings has been effected. Thus, one chromone nucleus may be formed, this then linked to an appropriately substituted benzene ring which is thereafter converted into the second chromone nucleus.

The starting materials from which the compounds of formula I may be prepared may be defined as being those of the general formula

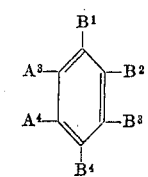

wherein the pair of groups $A^3$ and $A^4$ either together form the chain —CO—CR$^1$ = C(COOH)—O—
or a derivative thereof or form the pair of groups $A^1$ and $A^2$ which represents a chain or a pair of groups (one of which may be hydrogen) convertible either directly or via another chain or pair of groups to a —CO—CR$^1$ = C(COOH)—O— chain or derivative thereof; one of $B^1$, $B^2$, $B^3$ or $B^4$ represents a group L and the others are each selected from hydrogen or substituents other than hydrogen (i.e. the desired P-T groups, precursors therefor or derivatives thereof); and L is either a group

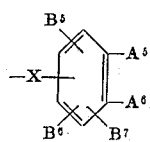

when A³ and A⁴ form the pair of groups A¹ and A² [A⁵ and A⁶ being either the desired —CO—CR¹ = C(COOH)—O— chain or the groups A¹ and A²; and B⁵, B⁶ and B⁷ may be the same or different and each is selected from hydrogen or a substituent other than hydrogen i.e. is the desired substituent $P_1$, $Q_1$ or $T_1$ or a precursor therefor or a derivative thereof)] or is a group L¹ or a precursor therefor capable of reacting with a group L² which may be hydrogen or a substituent in a compound

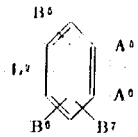

to form the desired —X— linkage or a precursor therefor.

The methods for preparing the compounds of formula I may be generally defined as comprising conversion of such groups A¹ and A² and L¹ as may be present in a starting material of formula II into the desired —CO—CR¹ = C(COOH)—O— chain or derivative thereof and the desired

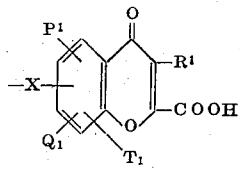

group or derivative thereof respectively. Where the compound II is not a linked compound, the process for preparing the compounds of formula I will involve at some stage the reaction of a compound of formula III

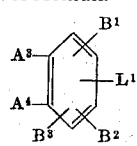

with a compound of Formula IV

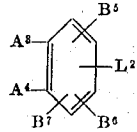

with conversion of either or both pairs of groups A³ and A⁴ (if these are the pairs of groups A¹ and A²) to the desired —CO—CR¹ = C(COOH)—O— chain or a derivative thereof.

For convenience, the linkage and pyrone ring formation will be described herein as separate processes, although it will be understood that this separation is arbitrary and that it is possible to carry out part of the formation of either or both pyrone rings then to effect linkage and thereafter to complete ring formation.

It will be appreciated that precursors of the above compounds, that is compounds which react under the conditions of the reaction as the above compounds, may be used. Thus, for example an acetoxy derivative of a phenollic hydroxy group in a compound may be used in place of the free hydroxy group. It is to be understood that in the following process for preparing the compounds of formula I active precursors may also be used where appropriate.

The conversion of a pair of groups A¹ and A² in a starting material of formula II may be achieved in a number of ways. Thus, the desired pyrone ring may be formed by cyclizing compounds of the general formulas:

V

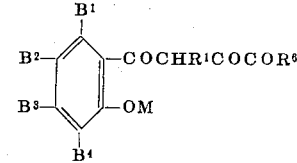

VI

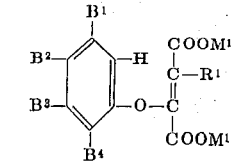

and

VII

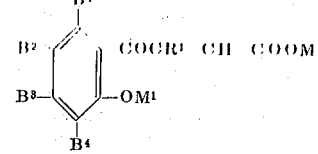

[wherein R⁶ is an OM group or a group convertible thereto, M¹ is hydrogen or an alkali-metal cation and M is an M¹ group or an alkyl group], with oxidation or dehydrogenation of the product if required. The desired pyrone ring may also be formed by modification of an already formed chromone or chromanone compound (i.e. compounds of formula II wherein A¹ and A² together form the chain —CO—CR¹ = C(D¹)—O— or —CO—CHR¹—CH(D)—O—, wherein D is a —COOM group or a group D¹ which is convertible to a COOH group or derivative thereof) for example by oxidation of substituents in the 2-position of the ring or by dehydrogenation.

The compounds of formula V may be readily cyclized, for example by heating directly or in a solvent such as ethanol, glycerol or dioxan. Cyclization may be carried out under neutral conditions or in the presence of an organic base such as pyridine. However, it is preferred to carry out cyclization in the presence of a cyclization agent and also desirably in an organic solvent medium, such as ethanol. Ideally the acid cyclization agent is an acid such as a polyphosphoric acid, sulphuric acid, hydrochloric acid, acetic acid, toluene -p-sulphonic acid or mixtures thereof. Water may be present in the cyclization reaction mixture, as when concentrated aqueous acid is used as the cyclization agent. When a compound of formula V is used wherein M is an alkyl group, simultaneous cyclization and dealkylation may be achieved by the use of hydriodic or hydrobromic acid as the cyclization catalyst.

Cyclization may be carried out at from ambient temperature to about 100°C, for example by heating the reaction mixture on a steam bath and, where the nature of the reaction medium permits it, under reflux.

As indicated earlier, the group R⁶ in the compound of formula V is an OH group, or a group which is convertible to an OH group. Such conversion may have already occurred in the cyclization of the compound or may have taken place prior to cyclization. However, where this is not the case, such conversion may be readily achieved using conventional methods.

Alternatively, the R⁶ group may be converted into a more desirable derivative, for example an alkoxy group, and such further conversion is also within the scope of this invention.

The compounds of formula V may themselves be prepared by a number of methods. For example, a compound of the formula:

VIII

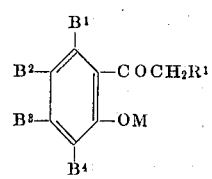

(wherein $R^1$ has the values given above and M is hydrogen, an alkali-metal cation or an alkyl group, such as a lower alkyl group, e.g. a methyl, ethyl, propyl or pentyl group), may be condensed with a compound of the formula $R^7$ CZ—CZR$^8$ wherein $R^7$ and $R^8$ may be the same or different, one being a group reactive with an hydrogen in the —CO—CH$_2$R$^1$ group of the compound VIII, the other being an R$^8$ group, and each Z is a carbonyl oxygen or one may represent two halogen atoms and the other is a carbonyl oxygen. Suitable groups which react with a —CO—CH$_2$R$^1$ group include alkoxyl, amino, alkylamino, substituted amino or substituted alkylamino groups. It will be appreciated that these groups include groups which are also convertible to OH groups. Where $R^7$ and/or $R^8$ is a substituted amino group, the nitrogen atom may carry one or two groups E, wherein E is a lower alkyl, a substituted or unsubstituted aryl, alkaryl or haloaryl group. In the case where the nitrogen carries only one group E the substituent may be linked to the nitrogen through an —SO$_2$— group. Examples of suitable compounds for present use include those of the general formulas $R^9$OOC—COOR$^9$ (wherein each $R^9$ is an alkyl group, such as methyl, ethyl, propyl, butyl, pentyl group; an aralkyl group such as a benzyl group; or an alkenyl group such as an allyl group); and $R^9$O—C(Hal)$_2$—COOR$^9$ (wherein Hal is halogen, preferably chlorine or bromine). Preferred compounds of formula $R^7$CZ—CZR$^8$ for present use include diethyl oxalate, ethyl ethoxydichloroacetate, ethyl oxamate, ethyl oxalylanilide and ethyl oxalyl-toluene -p- sulphonamide.

The condensation of the compound VIII with the compound of formula $R^7$CZ—CZR$^8$ may be carried out merely by mixing the reactants together and heating, if desired, to a temperature of from 25° to 150° C, preferably about 70° to 80° C. In the case of the oxalate esters, the reaction is desirably carried out in the presence of a condensation agent. Suitable agents include, for example, metal alkoxides, such as sodium ethoxide, sodium hydride, sodamide or metallic sodium. The condensation agent may be formed in situ, for example by the use of ethanol as the reaction medium and the addition of metallic sodium. In some cases the alkali-metal salt of the compound of formula VIII (that is when M is alkali-metal) may act as part of the condensation agent required. Where a substituted dihaloacetate is used, it may be preferred to carry out the reaction in the presence of a finely divided metal catalyst, such as a finely divided platinum group metal.

If desired, the reaction may be carried out in an inert solvent or diluent medium, such as diethyl ether, dioxane, ethanol, benzene, toluene, tetrahydrofuran, or mixtures thereof.

Whilst the reactants may be employed in substantially stoichiometric proportions, it will usually be preferred to use a substantial excess of the compound $R^7$CZCZR$^8$. When used, the condensation agent is desirably used in from 200 to 750 molar percent based on the amount of the compound of formula VIII used, preferably from 200 to 500 molar percent.

It will be appreciated that the condensation reaction is desirably carried out under substantially anhydrous conditions.

The reaction mixture of the above reaction will usually contain the compound of formula V, or a precursor thereof, though in some cases cyclization of the product to the chromone-2 carboxylic acid, or a salt or derivative thereof, may take place spontaneously. Cyclization of the compound of formula V may also be achieved in situ by acidifying the reaction mixture. It is usually preferred to recover the compound of formula V from the reaction mixture and to cyclize it in the presence of a cyclization agent, optionally in the presence of a small amount of water, as described above. The compound may be recovered from the crude reaction mixture wherein it was prepared by conventional techniques.

The compound of formula V may also be prepared by the reaction of a compound of formula VIII wherein M is hydrogen or an alkali-metal cation with a dicarbonyl compound of formula $R^7$COCOR$^8$ wherein $R^7$ and $R^8$ have the values given above, except that one or both of $R^7$ and $R^8$ are halogen. Suitable dicarbonyl compounds for use in this case include oxalyl chloride and compounds wherein $R^7$ is chlorine or bromine and $R^8$ is an OH, alkoxy (e.g. methoxy or ethoxy), NH$_2$, phenylamino or toluene -p- sulphonyl-amino group. The reaction using these halo compounds may be carried out in a manner similar to that described in relation to the use of the other compounds $R^7$ CZCZR$^8$, except that an acid-binding agent is used in place of the condensation agent and that the use of an anhydrous organic solvent is desirable. Suitable dicarbonyl compounds for use in this case include oxalyl chloride and compounds wherein $R^7$ is chlorine or bromine and $R^8$ is an OH, alkoxy (e.g. methoxy or ethoxy), NH$_2$, phenylamino or toluene -p- sulphonyl-amino group. The reaction using these halo compounds may be carried out in a manner similar to that described in relation to the use of the other compounds $R^7$CZCZR$^8$, except that an acid-binding agent is used in place of the condensation agent and that the use of an anhydrous organic solvent is desirable.

Suitable acid-binding agents include alkalis, such as sodium or potassium carbonate; alkali-metal alkoxides, e.g. sodium alkoxide; and organic amines such as pyridine or triethylamine. The acid-binding agent is present in at least the theoretically stoichiometric amount to bind all the halogen in the dicarbonyl compound. It may be desired to use an excess of acid-binding agent, and if desired, the acid-binding agent may be added to the reaction mixture in a series of additions over a period of time. In some cases the acid-binding agent may be used as the reaction medium. The reaction mixture from this process will usually contain the intermediate product of the formula

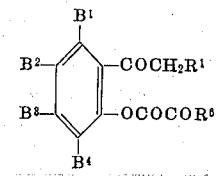

or a precursor or derivative thereof, though in some cases rearrangement of this intermediate to yield the compound of formula V may have occurred spontaneously. Furthermore, where an acid chloride such as oxalyl chloride is reacted with a compound of formula VIII in pyridine it is believed that the compound of formula I, or a salt thereof, may be produced directly. Rearrangement of the intermediate may also be achieved in situ by heating in a medium such as glycerol, optionally in the presence of an alkali. However, it is usually preferred to recover the intermediate product from the reaction mixture and rearrange it, after any purification that may be desired, in a separate reaction step. The recovery and purification of the intermediate product may be achieved by conventional methods.

Rearrangement of the intermediate product may be achieved by heating the crude, or purified, recovered material under non-acidic conditions and preferably in an inert solvent or diluent medium such as benzene, dioxan, anisole or the like. The non-acidic conditions may be achieved by the presence of a base, such as pyridine, or of a mineral alkali such as potassium hydroxide, sodium carbonate, potassium carbonate, sodium hydride, sodium alkoxides, e.g. sodium methoxide, or metallic sodium. If desired, the rearrangement may be carried out under the influence of heat, for example at from ambient temperature to 100° C, (e.g. by heating on a steam bath and, where the reaction mixture permits it, under reflux. Preferably the re-arrangement is carried out under substantially anhydrous conditions, i.e. in the absence of significant amounts of initial or added water. The amount of alkali present may be from 100 to 1000 molar percent, based on the amount of the intermediate product being rearranged and may, if desired, be added in a single addition or in a series of additions over a period of time.

The compound of formula V or a derivative or precursor thereof, may be recovered from the reaction mixture in which it was formed by conventional methods with, if necessary, conversion of the $R^6$ group into a more desired substituent as outlined above.

In a further process for preparing the compounds of formula V, an appropriately substituted salicylic acid or ester thereof is reacted with a compound of the formula $CH_3CO\ COOR^9$, wherein $R^9$ has the values given above. The reaction is desirably carried out in an inert medium such as ethanol, anisole, benzene or dioxan and it is preferred to employ a condensation agent such as an alkali-metal alkoxide (e.g. sodium ethoxide), sodamide, sodium hydride or metallic sodium.

The compounds of formula VI may be cyclized by treating the compound with a cyclization agent at ambient temperature or above. Suitable cyclizing agents include dehydrating agents concentrated acids such as polyphosphoric acid, sulphuric acid, chlorsulphonic acid and other Lewis acids. It will be appreciated that, since cyclization is achieved in these cases by the use of dehydration agents, the presence of added or initial water in the reaction mixture is undesirable. It is usually preferred to subject the compounds of formula VI to an initial drying step and to carry out the cyclization reaction under substantially anhydrous conditions.

Alternatively, cyclization may be achieved by converting the free carboxyl groups of the compound of formula VI into acyl chloride groups, for example by treatment with $PCl_3$, $PCl_5$ or $SOCl_2$, and subjecting the resultant acyl chloride to an internal Friedel Crafts reaction.

The compounds of formula VI when $R^1$ is hydrogen may be obtained by the reaction of a compound of formula:

IX
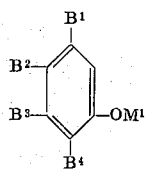

(wherein $M^1$ is hydrogen or an alkali-metal cation) with an acetylene dicarboxylic acid or ester thereof under alkaline conditions to produce a product which, upon hydrolysis, yields the compound of formula VI. The acetylene dicarboxylate esters may be derived from alcohols having from one to ten carbon atoms. However, since the ester moiety is to be eliminated, it is preferred to use simple esters derived, for example, from methyl, ethyl, propyl, or butyl alcohols. It is preferred that both carboxylic acid groups on the acetylene dicarboxylic acid be esterified. In this process the ester and compound IX are reacted, preferably in approximately stoichiometric amounts, under alkaline conditions. These may be achieved by the presence of an organic base such as benzyl trimethyl ammonium hydroxide, or of an alkali-metal hydroxide. However, it is convenient to have the alkali present in the form of an alkali-metal salt, especially the sodium salt, of the compound IX, such a salt being considered as free compound when assessing the amount of compound IX present in the reaction mixture. Where this is done, the alkali-metal salt of compound IX may conveniently be made in situ in the reaction mixture by the addition of metallic sodium. The alkali is believed to act catalytically and it is possible to use less than 100 molar percent thereof based on the amount of compound IX present. We prefer to use from 5 to 20, preferably about 10, molar percent. It will be appreciated that the reaction, especially where the alkali-metal salt is formed in situ, is desirably carried out under substantially anhydrous conditions. It is also preferred to carry out the reaction in a solvent or diluent medium. Suitable media include, for example, an excess of compound IX, diphenyl ether, dioxan and anisole. These media have the advantage that the reaction may be carried out at elevated temperatures at atmospheric pressure. It is generally preferred to carry out the reaction at temperatures of from 50° C to 150° C.

In place of the acetylene dicarboxylate ester used in the above process for the preparation of the compound of formula VI, an ester of a mono-halofumaric acid, or a precursor thereof may be used, i.e. ester of acids of the general formula:

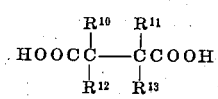

wherein $R^{12}$ is halogen and $R^{13}$ is an $R^1$ group when $R^{10}$ and $R^{11}$ together form a carbon to carbon bond; or $R^{10}$ is halogen and $R^{11}$ is an $R^1$ group, and one of the other two is hydrogen and the second is halogen. In this case the reaction is not an addition reaction but a condensation reaction which involves at some stage the elimination of the elements of a halogen acid from between the compound IX and the halofumarate ester. This halogen acid must be eliminated from the system and the reaction is therefore carried out in the presence of at least sufficient of an acid-binding agent to eliminate the elements of the halogen acid which will be formed during the overall process. The elements of the halogen acid are not necessarily eliminated in one step, but may be eliminated firstly as a proton and then as an halogen anion. The term acid-binding agent is therefore used in this context to denote both conventional acid-binding agents, such as pyridine and triethylamine, and materials which eliminate for example, first the hydrogen from the compound IX (to form a salt thereof) and then are displaced from the organic salt to form an inorganic salt with the halogen of the halofumarate ester. Apart from the use of a different acid ester reactant and the presence of the acid-binding agent, the process may be carried out in similar manner to that when an acetylene dicarboxylate ester is used. Since the acid-binding agent is usually also a strong alkali, there is generally no need to provide a separate strong alkali in the reaction mixture. As will be appreciated from the general formula for the acids which may be used to react with the compound IX, the use of the monohalofumarate ester or precursors thereof permits the introduction of an $R^1$ group into the molecule.

As indicated above, it is also possible to use compounds which yield the desired halofumarate esters under the conditions of the reaction with the compound IX. Such other compounds or precursors, include halomaleate esters and dihalosuccinate esters. When precursors are used, it may be necessary to provide extra alkali to ensure conversion of the precursor to the desired halofumarate ester. Such alkali may be merely an excess of the acid-binding agent.

The products obtained from the reactions outlined immediately above usually contain the compounds of formula VI in the form of their esters. The compounds of formula VI may be recovered from these products by acidification of the reaction mixture, hydrolysis of the esters by boiling with alkali and acidification to liberate the free acid and extraction of the equeous solution with, for example, ether which may thereafter be evaporated. The product may, if necessary, be subjected to further purification, for example, by extracting the ethereal solution with sodium bicarbonate and then precipitating the acid of formula VI by addition of dilute sulphuric acid.

The compounds of formula VII may be cyclized by treatment with an alkali or organic base in a suitable inert solvent to give a 2-carboxychromanone compound. This may subsequently be converted into the 2-carboxychromone compound by oxidation or dehydrogenation or by halogenation followed by dehydrohalogenation as described below. Simultaneous oxidation and cyclization to the desired 2-carboxychromone compound may be brought about by the introduction of a suitable oxidant into the cylization stage (e.g. selenium dioxide in an inert solvent).

The compounds of formula VII may be prepared by reacting a compound of formula VIII wherein M is hydrogen or an alkali-metal cation with glyoxalic acid or an ester thereof in the presence of a base (e.g. aqueous sodium hydroxide) or a mineral acid. A water miscible solvent, e.g. alcohol, may be added to facilitate the reaction.

Alternatively, a compound of formula IX wherein $M^1$ is hydrogen is heated at a temperature of, for example, 25 to 150° C with maleic anhydride in a solvent or diluent medium, such as nitrobenzene or carbon disulphide, in the presence of a Lewis acid, such as an excess of aluminum chloride. The complex which is produced by this process may then be decomposed with a dilute mineral acid, such as hydrochloric acid, and the solvent removed, for example by distillation or steam distillation. The residue, which contains the compound of formula VII wherein M is H, may be recovered using conventional techniques and then purified by, for example, recrystallation. However, the reaction may proceed to give a 2-carboxychromanone directly without isolation of an intermediate.

In the processes outlined above, we believe that the compounds V to VII are all necessary intermediates in the conversion of the various starting materials to chromone-2-carboxylic acids or derivatives thereof. However, in many cases the intermediates are formed under those conditions required to achieve cyclization and therefore exist only transitorily. Whilst, for clarity, these processes have been described as if the compounds V to VII were necessarily isolated prior to cyclization the invention embraces those processes wherein the intermediate undergoes cyclization without separation or isolation from the reaction mixture in which it has been prepared.

As indicated above, the desired compound of formula I may also be formed from a compound already containing a nucleus, i.e. from a compound of formula

X

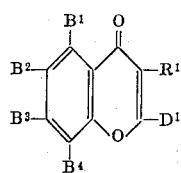

wherein $D^1$ is a group which is convertible to a —COOH group or a derivative thereof. Examples of suitable $D^1$ groups include nitrile, amide and ester groups which may be hydrolyzed to a carboxylic acid group; alkyl or substituted alkyl groups such as methyl, hydroxymethyl, halomethyl e.g. chloromethyl, bromomethyl, dichloromethyl, trichloromethyl), acyl groups such as formyl or acetyl groups, and alkenyl and aralkenyl groups such as vinyl, ω-trichloromethylvinyl and styryl groups, all of which are groups oxidizable or hydrolyzable to a carboxylic acid group. The conversion of the $D^1$ group to a COOH group or derivative thereof may be achieved using any of the known methods.

The compounds of formula X may be prepared by a variety of methods, many of which are closely analogous to the processes described above for the preparation and cyclization of the compounds of formulas V to VII except that in place of the starting materials V, VI and VII compounds of the formulas

XI

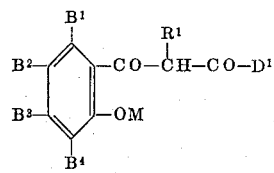

XII

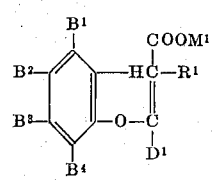

and

XIII

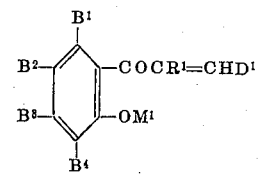

are used and that the final product requires conversion of the $D^1$ group to the -COOH group or derivative thereof. Such analogous processes may together be broadly described as a process for preparing a compound of formula I by conversion of a compound of the formula

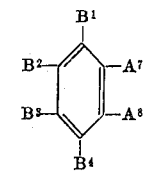

[wherein $A^7$ and $A^8$ are the pairs of groups —CO—CHR$^1$—COD and OM; H and —O—C(D) = CR$^1$COOM$^1$; or —CO—CR$^1$ = CHD and OM$^1$ respectively and D, M, M$^1$, R$^1$, B$^1$, B$^2$, B$^3$ and B$^4$ have the values given above] during which cyclization of the groups $A^7$ and $A^8$ takes place.

Thus, the compounds of formula X may be prepared by cyclizing a compound of formula XI under the conditions described above for the cyclization of the compound of formula V. In some instances cyclization may occur spontaneously.

The compounds of formula XI may themselves be prepared by condensing a compound of formula VIII with a compound of formula D$^1$COR$^7$, wherein D$^1$ has the values given above and R$^7$ is a group reactive with a hydrogen in the —COCH$_2$R$^1$ group of the compound VIII. Suitable compounds D$^1$COR$^7$ include esters and amides or substituted amides of substituted or unsubstituted acetic and cinnamic acids and the like, e.g. a compound of the formula (MO)$_2$CHCOOM such as ethyl diethoxyacetate. The condensation may be achieved by the methods outlined earlier for the production of the compounds of formula V from the compound VIII and the compounds R$^7$CZ—CZR$^8$.

The compounds XI may also be prepared from the compound VIII and the compounds D$^1$COR$^7$ wherein R$^7$ is halogen via, if necessary, the rearrangement of a compound of the formula:

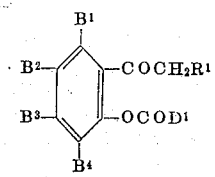

using conditions similar to those set out above for the preparation of the compounds of formula V by the analogous route.

Particular examples of the preparation of compounds XI include the preparation of those compounds wherein D$^1$ is a methyl group by reaction of an alkyl acetate, i.e. the compounds D$^1$COR$^7$ wherein D$^1$ is a methyl group and R$^7$ is an alkoxy group, with a compound VIII under the condensation conditions outlined above for the preparation of the compounds V.

The styryl compound of formula XI, that is where D$^1$ is

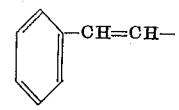

may be prepared from the compound VIII by reaction with sodium cinnamate and cinnamic anhydride using a Kostanecki Robinson synthesis, or by reaction with a cinnamoyl halide, e.g. cinnamoyl chloride, in the presence of an acid-binding agent to yield the cinnamate ester of the compound VIII, followed by rearrangement with a base, e.g. potassium carbonate, in the presence of an inert solvent such as toluene or benzene, to give the compound XI of the formula:

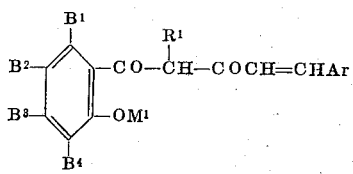

wherein Ar denotes a benzene ring.

From these examples of the preparation of the compounds of formula XI it will be appreciated that certain of the processes for preparing the compounds of formulas V and XI may together be broadly described as processes wherein a compound of formula VIII is reacted with a compound.

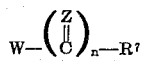

wherein $R^7$ is a group reactive with an hydrogen in the —$COCH_2R^1$ group of the compound VIII, each Z is a carbonyl oxygen or one may be two halogen atoms when the other is a carbonyl oxygen, $n$ is 1 or 2 and when $n$ is 1, W is a D group i.e. a COOM group or a group $D^1$ convertible to a COOH group or a derivative thereof, and when $n$ is 2, W is sn $R^6$ group, i.e. an OH group or a group convertible thereto.

The compounds of formula XII may be prepared by the reaction of a compound of formula IX with a substituted acetylene monocarboxylic acid, or ester thereof in a manner similar to that used to prepare the compounds of formula VI above. The acetylene monocarboxylic acids, or esters thereof, for present use have the general formula $D^1C \equiv C$—COOM wherein $D^1$ and M have the values given above. It is preferred that M be a lower alkyl group, such as a methyl or ethyl group. It is also possible to use precursors of acetylene monocarboxylic acids or esters, for example the mono-halo-ethylenic and dihalo-ethane analogues thereof.

The compounds of formula XII may be cyclized in a manner similar to that employed with the compounds of formula VI. As with the compounds of formula V and XI, the preparation of the compounds of formula VI and XII may together be broadly described as a process wherein a compound of formula IX is reacted with a compound of the formula

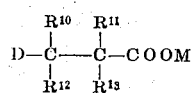

$R^{10}$, $R^{11}$, $R^{12}$, $R^{13}$ and D have the values given above and also the further value that when $R^{10}$ and $R^{11}$ together form a carbon to carbon bond, $R^{12}$ and $R^{13}$ may also form a carbon to carbon bond.

The compounds of formula XIII may also be prepared and cyclized in a manner similar to that used to prepare and cyclize the compounds of formula VII. Thus, a compound of formula VIII may be reacted with an aldehyde of the formula OHCD$^1$, for example cinnamaldehyde, under substantially the same conditions as are used to prepare the compounds of formula VII from glyoxalic acid. However, it may be preferred to employ compounds of formula VIII wherein M is an alkyl group and to dealkylate the reaction product to obtain the compound of formula XIII.

As with the other intermediate compounds, certain routes for the preparation of the compounds of formula VII and XIII may together be broadly described as comprising the reaction of a compound of formula VIII with a compound of the formula OHCD wherein D has the values given above.

In addition to the direct conversion of a compound of formula X into the desired compound of formula I, the $D^1$ group in compounds of formula X may be converted in known manner from one form of substituent into another more preferred substituent, $D^2$, which is then converted to the desired COOH group or derivative thereof.

Thus, the compound of formula X wherein $D^1$ is a methyl group also serves as an intermediate in the preparation of a member of other oxidizable derivatives. For example, the methyl group may be converted into an halo-methyl group, e.g. by reaction with hydrogen chloride and manganese dioxide in boiling acetic acid to produce the chloromethyl group; or by reaction with bromine in acetic acid to yield a bromomethyl group. The halomethyl group may be oxidized to a carboxylic acid group using, for example, chromium trioxide as oxidizing agent in the presence of acetic acid.

The methyl group may also be reacted with p-nitrosodimethylaniline and the reaction product hydrolyzed with dilute mineral acid to give a —CHO group which may oxidized to a carboxylic acid group using, for example, chromium trioxide as reagent. Condensation of a methyl group with a benzaldehyde in the presence of a condensation catalyst gives a styryl group which may be oxidized to a carboxylic acid group using, for example, potassium permanganate.

The —CHO group may serve as a starting point for the preparation of a —CN group, e.g. by reaction with hydroxylamine to yield an oxime which may be dehydrated to give the —CN group. This may then be hydrolyzed to a carboxylic acid group or amide thereof, under acid conditions.

As stated earlier, the chromone-2-carboxylic acids may be prepared by conversion of a chain —CO—CHR$^1$—CH(D)—O— to the desired —CO—CR$^1$ = C(COOH)O— chain. This conversion may go via a compound of formula X when the group D is a group $D^1$, or may proceed directly to the chromone-2-carboxylic acid or a derivative thereof. Thus, the chromone-2-carboxylic acids may also be prepared from corresponding chromanone compounds by dehydrogenation followed, or preceded, by oxidation or hydrolysis of any substituent in the 2-position, if this is necessary. The dehydrogenation may be effected by, for example, the use of selenium dioxide, palladium black or chloranil. Alternatively, dehydrogenation may be carried out indirectly by halogenation followed by dehydrohalogenation. Thus, the chromanone may be brominated using N-bromosuccinimide in an inert solvent or by treatment with pyridinium perbromide in an inert solvent such as chloroform in the presence of a free radical catalyst such as benzoyl peroxide, to yield the 3-bromo derivative which may subsequently be dehydrobrominated. The chromanones themselves may be obtained by the action of a γ-substituted γ-chloropropionic acid or derivative thereof on a compound of formula IX in the presence of a basic reagent, followed by conversion of the acid function to the acid chloride and treatment with aluminum chloride in the presence of a suitable solvent (e.g. nitrobenzene); or by the action of a compound of formula IX on a β-substituted acrylonitrile, with subsequent hydrolysis and cyclization of the product. As indicated above, cyclization of the intermediates VII and XIII may lead to the production of a corresponding chromanone compound, which may then be converted as outlined above to the desired chromone compound.

In addition to the above outlined methods for preparing the chromone-2-carboxylic acids via the intermediates V to VII and X to XIII, other methods may be devised which do not necessarily produce any of these intermediates. Thus, an acetyl halide, acetic anhydride or acetic acid may be condensed with an oxalate ester of the type R$^{14}$OOC—COOR$^{15}$ wherein R$^{14}$ is an aryl group and R$^{15}$ is an alkyl or an aryl group, the condensation being carried out in the presence of a Lewis acid. The oxalate ester may itself be obtained by the esterification of a compound of formula IX with the appropriate oxalyl halide. A further process whereby the chromone-2-carboxylic acids may be obtained is one wherein a compound of formula IX is heated with an alkyl alkoxalylacetate, such as ethyl ethoxalylacetate, optionally in the presence of a dehydrating agent such as phosphorus pentoxide.

The pairs of groups $A^1$ and $A^2$ may also form a chain which may be converted into a pair of groups from which the desired —CO—CR$^1$ = C(COOH)—O— chain may be derived. Thus $A^1$ and $A^2$ may form a chain —O—CO—CH = CT$^2$—

(where $T^2$ is an alkyl, e.g. methyl, or aryl group) which may be cleaved by treatment with an alkali or hydrazine to yield a compound wherein $A^1$ is OH or a derivative thereof and $A^2$ is hydrogen.

From the above example of the conversion of the groups $A^1$ and $A^2$ into the desired —CO—$CR^1$ = C(COOH)—O— chain or a derivative thereof, it will be seen that many of these routes may be together broadly described as the conversion of compounds wherein $A^1$ and $A^2$ form the pairs of groups —OM and —H or —COJ; —H and —OCD $CR^1COOM$; —OCOCOR$^6$ and —H or —COCH$_2$R$^1$ respectively [wherein J is a group —CH$_2$R$^1$, —OM, —CHR$^1$COD or —CR$^1$ = CHD, and $R^1$, $R^6$, D and M have the values given above] or wherein $A^1$ and $A^2$ together form a chain —CO—$CR^1$ = C(D$^1$) O—, —CO—CHR$^1$—CH(D)O— or —O—CO—CH = CT$^2$ (T$^2$ being an alkyl or aryl group).

The processes outlined above may produce the free acids of formula I or may yield derivatives thereof. It is also within the scope of the present invention to treat the product of any of the above processes, after any isolation and purification steps that may be desired, in order to liberate the free acid therefrom or to convert one form of derivative into another. The methods used to isolate and purify any product may be those conventionally used. Thus, salts may be prepared by the use of alkaline conditions during the recovery and purification of the compound. Alternatively, the free acid may be obtained and subsequently converted to a desired salt by neutralization with an appropriate base, e.g. an organic amine, or an alkali such as an alkali-metal or alkaline-earth metal hydroxide, carbonate or bicarbonate, preferably a mild base or alkali such as sodium carbonate or bicarbonate. Where the compound is recovered in the form of a salt, this salt may be converted to a more desirable salt, for example by a metathetical process. The esters may be obtained as a result of having used appropriate starting materials, for example by the reaction of a dialkyl oxalate with a compound of formula VIII as hereinbefore described; may be formed by the reaction of an appropriate alcohol, alkyl sulphate or halo- compound with free carboxyl groups in the compound I; or may be formed by the reaction of an appropriate alcohol with an acyl halide of the compound of formula I. Alternatively, transesterification techniques may be used to exchange one ester group for another. The amides may be readily obtained, for example, by dehydration of the ammonium salt or by reaction of an ester or acyl halide with an appropriate amino compound such as ammonium hydroxide or a primary or secondary amine or an amino acid. Alternatively, the free acid of formula I may be condensed with an alkyl haloformate (e.g. chloroformate) in the presence of an organic base such as triethylamine, to yield a mixed anhydride which is then treated with an amino-acid or ester thereof in the presence of a suitable solvent to give an N-carboxyalkyl substituted amide. The mixed anhydride need not be isolated from the reaction mixture in which it was prepared, but may be treated in situ.

As indicated above, the general formula II for the starting material is intended to relate not only to compounds containing only one benzene ring but also to compounds which already possess the two rings linked by an —X— linkage. Where the starting material is not already linked, such linkage may be achieved by a variety of methods depending upon the nature of the —X— linkage, and at any suitable point during the production of the compounds of the invention. Moreover, the linkage group or atom —X— may be introduced into one molecule of the starting material which is then treated to convert the $A^1$ and $A^2$ groups partially or wholly to the desired —CO—$CR^1$ = C(COOH)—O— chain and a further molecule of starting material or a chromone nucleus then attached to the free end of the linkage atom or group —X—. For convenience, the methods of forming the —X— linkage will be described in terms of linking two molecules of the same starting materials II through the $B^2$ positions in a single process, i.e. by reacting the compounds III and IV referred to earlier. It will be understood that in many cases the initial linkage produced may be a precursor of the desired linkage, as when substituents are to be present upon the desired final linkage. The intermediate linkage may be converted to the desired form using the appropriate conventional techniques. For example, the hydroxy group of an hydroxy methylene linkage may be converted to an alkoxy group, a halogen group, an ester group or an hydroxyalkoxy group by reaction with an alkyl halide, PCl$_3$ or PCl$_5$, an acid halide or an alkylene oxide respectively.

Where the —X— linkage is to be a carbon to carbon bond, such a linkage may be achieved by an Ullmann reaction in which two molecules of the starting material of formula II where $B^2$ is halogen, notably iodine, are heated with copper. Where the linking group is to be an —O— group, such a linkage may be formed by reacting a starting material wherein the $B^2$ substituent is halogen (i.e. a compound of formula III where $L^1$ is halogen) with a molecule of a second starting material wherein the $B^2$ substituent is an OH group (i.e. a compound of formula IV wherein $L^2$ is OH), or an alkali metal salt thereof. Alternatively, other pairs of starting materials may be used where the $B^2$ substituents are such that they yield an ether linkage upon reaction with one another, for example where one $B^2$ substituent is an anion-forming group such as a tosylate or methyl sulphonate group and the other is an OH group, a salt thereof or an active precursor thereof such as an acetoxy group. Where the linking group is a sulphur atom this may be formed by reacting a starting material wherein the $B^2$ substituents are hydrogen with thionyl chloride in the presence of a metal, such as copper bronze, or with sulphur dichloride. The compounds containing an —S— linkage may be oxidized to yield compounds having —SO— and —SO$_2$— linkages. The sulphone linkage may also be formed by reacting sulphonyl chloride or chlorosulphonic acid with the appropriate starting material. Alternatively, chlorosulphonic acid may be reacted with an appropriate starting material to yield an aryl sulphonyl chloride which may then be reacted with another molecule of the starting material to yield the desired linked compound.

The methylene linkage may be formed by the condensation of, say, resacetophenone with di-iodomethane under alkaline conditions in the presence of an inert solvent or diluent. Alternatively, an appropriate phenol may be condensed with formaldehyde. The substituted methylene linkages may be readily obtained, for example, via the halo- or hydroxymethylene linkages as outlined above or by the condensation of an aldehyde with two molecules of the same or different phenols. The carbonyl linkage may be obtained by a Friedel Crafts reaction using an appropriately substituted benzoyl chloride and an appropriately substituted benzene. Alternatively, the carbonyl linkage may be formed by reacting an appropriately substituted phenol having the position para to the hydroxy group free with an appropriately substituted benzoic acid in the presence of at least 10 mols of anhydrous liquid hydrogen fluoride per mol of phenol, the reaction being carried out at from 20° to 100°C.

The NH linkage may be achieved by the elimination of the elements of ammonia between two molecules of an amino-substituted starting material.

The substituted nitrogen linkages may readily be prepared from the NH linkages using conventional techniques.

In the above examples of methods by which the —X— linkage may be achieved, it has been assumed that the linkage process will not affect any groups already present and that the introduction of other groups into the linked product (such as either or both of the pyrone rings or other substituents on the benzene rings) will not detrimentally affect the linkage —X—. However, where this is not the case, it may be necessary to shield or block susceptible groups, for example by alkylation, acetylation or benzylation, or to block the intended site of such a group with a cyano or nitro group which will remain unaffected during the reaction process and may thereafter be removed to leave a free position into which a substituent may, if desired, be introduced. The concept of blocking or shielding susceptible sites or groups is of especial relevance in those cases where, for example, linkage or cyclization could occur in two forms, giving rise to by-products. The shielding or blocking may be achieved by any of the conventional methods and the desirability of carrying out such shielding or blocking will be readily apparent. Reference to particular instances of blocking or shielding of groups has not therefore been made in the present specification, it being understood that such steps will be applied where desirable and that the processes of the invention will, where appropriate, include such steps and the steps necessary to free the shielded site or group. It is also within the scope of this invention, therefore, to introduce one or more of the substituents P, Q, T, $P_1$, $Q_1$ or $T_1$ at a stage intermediate to or subsequent to introduction of the —X— linkage or either or both of the pyrone rings.

The formation of the —X— linkage by reaction of the compounds III and IV may take place in more than one stage, notably where the units to be linked are different or where the linkage is to carry substituents as indicated above. It may therefore be desirable to block or shield reactive groups other than that upon which reaction is required when introducing the group $L^1$ in to a compound of formula III.

In addition to providing the novel compounds of formula I, the invention also provides as novel compounds the intermediate of the formula

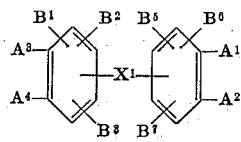

wherein $B^{1-3}$ and $B^{5-7}$ are the groups P–T and $P_1$–$T_1$ or are blocked or shielded sites therefor or precursors or derivatives of the desired P–T and $P_1$–$T_1$ groups; P, Q, T, $P_1$, $Q_1$ and $T_1$ have the values given above; $X^1$ is an X group or a precursor or derivative of the desired group; the pair of groups $A^3$ and $A^4$ is a chain —CO—$CR^1$ = C(COOH)—O—
or a derivative thereof or a pair of groups $A^1$ and $A^2$; and each pair of groups $A^1$ and $A^2$ may be the same or different and each pair forms the pairs of groups —OM and —H or —COJ; —H and —OC(D) = $CR^1$COOM;
—OCOCOR$^6$ and —H or —COCH$_2$R$^1$ (wherein J, $R^1$, $R^6$, M and D have the values given above) or together form the chains —COCR$^1$ = C($D^1$)O—, —COCHR$^1$—CH(D)O— or —O—CO—CH = CT$^2$ ($T^2$ being an alkyl or aryl group).

In order that the invention may be well understood, the following examples are given by way of illustration only, in which all parts are given by weight unless otherwise stated:

EXAMPLE 1

2,2'- Dicarboxy - 6,6'- bichromonyl monohydrate

To a stirred solution of sodium ethoxide in ethanol, prepared from 3.68 parts of sodium and 50 parts of ethanol, was added a slurry of 2.7 parts of 3,3'-diacetyl-4,4'-dihydroxybiphenyl and 14.6 parts of diethyl oxalate in 80 parts of diethyl ether. The mixture was stirred and heated under gentle reflux for 4 hours.

Water and diethyl ether were added followed by 10 parts of 10 percent aqueous sodium hydroxide solution. The aqueous layer was separated and acidified with concentrated hydrochloric acid to give a pale green precipitate. This solid was crystallized from ethanol to give 1.0 parts of starting material as pale green needles, melting point 215°–6°C.

The ethanol solution was then concentrated to a small volume from which pale green needles crystallized. This solid was extracted with hot aqueous sodium bicarbonate solution. The solution was filtered, cooled and acidified with dilute hydrochloric acid to give a gelatinous precipitate. This solid was filtered as well as possible and crystallized, while still wet, from ethanol to give 0.7 parts of 2,2' -dicarboxy-6,6' -bicromonyl monohydrate as pale green needles, melting point 280°C.

Analysis:

|  | Found | |
|---|---|---|
| $C_{20}H_{10}O_8 \cdot H_2O$ requires: | C, 60.3; H, 2.93% | |
|  | C, 60.6; H, 3.05% | |

A solution of 0.66 parts of the 2,2'-dicarboxy-6,6'-bichromonyl monohydrate prepared as above and 0.3 parts of sodium bicarbonate in 70 parts of water was freeze-dried to give 0.66 parts of 2,2'-dicarboxy-6,6'-bichromonyl disodium salt as a yellow solid.

EXAMPLE 2

2,2'-Dicarboxy-6,6'-bichromonyl monohydrate a. 4,4'-Bis(trans-1,2-dicarboxy vinyloxy)-biphenyl To a solution of 4.6 parts of 4,4'-biphenol in 100 parts of dioxan were added 1.15 parts of metallic sodium. The mixture was heated under reflux for 18 hours, and 0.25 parts of unchanged sodium were removed. The mixture, under reflux, was treated with 10.3 parts of diethyl chlorofumarate and the resulting mixture was heated under reflux for 10 minutes. The mixture was cooled and acidified with 17 parts of 20% v/v aqueous sulphuric acid and heated on a steam bath for 1 hour with 50 parts of 25 percent sodium hydroxide solution. The mixture was cooled and acidified with 20 percent sulphuric acid, and the dioxan was distilled. The residue was diluted with 100 parts of water and filtered. From the clear solution, on standing, there was slowly deposited a solid, which was filtered off, washed with water and dried to give 7.6 parts of 4,4'-bis-(trans-1,2-dicarboxy vinyloxy)-biphenyl monohydrate, melting point 260°–70°C. d.

Analysis:

|  | Found: | |
|---|---|---|
| $C_{20}H_{14}O_{10} \cdot H_2O$ requires: | C, 55.9; H, 3.67% | |
|  | C, 55.6; H, 3.70% | | b. 2,2'-Dicarboxy-6,6'-bichromonyl monohydrate

A mixture of 4 parts of 4,4'-bis(trans-1,2-dicarboxy vinyloxy)-biphenyl monohydrate and 18.5 parts of concentrated sulphuric acid was stirred until it was homogeneous. The mixture was diluted with 80 parts of ice-water and the resulting insoluble material was filtered off, under gravity, and washed with water. The wet solid was boiled with 70 parts of ethanol and the insoluble material was again filtered off under gravity. The material was then extracted with sodium bicarbonate solution and the extract was re-acidified with dilute hydrochloric acid. The precipitated solid was filtered off and dried on a porous tile to give 0.25 parts of 2,2'-dicarboxy-6,6'-bichromonyl monohydrate, melting point 280°C, the structure of which was confirmed by identity of the infra-red spectrum and mixed melting point with the material obtained by Example I.

EXAMPLE 3

2,2'-Dicarboxy-5,5'-dimethoxy-6,6'-bichormonyl monohydrate a. Ethyl 6-iodo-5-methoxychromone-2-carboxylate To a stirred solution of sodium ethoxide in ethanol, prepared from 3.54 parts of sodium and 60 parts of ethanol, was added a slurry of 11.25 parts of 3-iodo-6-hydroxy-2-methoxyacetophenone and 13 parts of diethyl oxalate in 120 parts of diethyl ether. The mixture was stirred and heated under gentle reflux for 4 hours.

Water and diethyl ether were added and the aqueous layer separated. The aqueous solution was acidified with dilute hydrochloric acid and extrated with ethyl acetate. The acetate solution was dried over sodium sulphate and evaporated to leave a brown oil.

The oil was dissolved in boiling ethanol, 0.5 parts of concentrated hydrochloric acid were added and the solution was boiled for 10 minutes. A yellow solid which crystallized out on cooling, was shown to be a mixture of acid and ester by thin layer chromatography.

This mixture was completely esterified by boiling with ethanolic hydrogen chloride from which 11 parts of the ester crystallized on cooling. This was recrystallized from an ethanol-dioxan mixture to give 9.6 parts of ethyl 6-iodo-5-methoxychromone-2-carboxylate as yellow needles, melting point 202°–4°C.

Analysis:
|  | Found: | C, 41.3; H, 2.78; | I, 34.0% |
|---|---|---|---|
| $C_{13}H_{11}IO_5$ requires: |  | C, 41.7; H, 2.94; | I, 33.95% | b. 2,2'-Diethoxycarbonyl-5,5'-dimethoxy-6,6'-bichromonyl

A mixture of 3.4 parts of the ethyl 6-iodo-5-methoxychromone-2-carboxylate prepared as above and 8 parts of copper bronze in 30 parts of dimethylformamide was heated at 155°–60° for 6 hours. The hot solution was then filtered and the copper was washed with hot dimethylformamide.

The organic solution was poured into water and extracted continuously with hot ethyl acetate for 15 hours. The ethyl acetate was concentrated to small volume to give a yellow crystalline solid. This solid was recrystallized from an ethanol-dioxan mixture to give 0.34 parts of 2,2'-diethoxycarbonyl-5,5'-dimethoxy-6,6'-bichromonyl as pale yellow needles, melting point 279°–81°C.

Analysis
|  | Found: | C, 63.7; H, 4.52% |
|---|---|---|
| $C_{26}H_{22}O_{10}$ requires: |  | C, 63.2; H, 4.49% | c. 2,2'-Dicarboxy-5,5'-dimethoxy-6,6'-bichromonyl monohydrate

The free acid was liberated from the above ester by treating a hot solution of 0.26 parts of the 2,2'-diethoxy-carbonyl-5,5'-dimethoxy-6,6'-bichromonyl in 20 parts of ethanol and 5 parts of water with an excess of sodium bicarbonate. Water was added till all the sodium bicarbonate had dissolved and the heating was continued till thin layer chromatography showed complete hydrolysis of the diester.

The solution was then cooled and acidified with concentrated hydrochloric acid to give a yellow gelatinous precipitate. This solid was filtered as well as possible and triturated with ethanol. This solid was collected by centrifugation and dried to give 0.13 parts of 2,2'-dicarboxy-5,5'-dimethoxy-6,6'-bichromonyl monohydrate as a yellow solid, melting point 275°–6°C.

Analysis:
|  | Found: | C, 58.1; H, 3.27% |
|---|---|---|
| $C_{22}H_{14}O_{10} \cdot H_2O$ requires: |  | C, 57.9; H, 3.5% | d. 2,2'-Dicarboxy-5,5'-dimethoxy-6,6'-bichromonyl disodium salt

The free acid was converted into its disodium salt by freeze drying a solution of 0.12 parts of 2,2'-dicarboxy-5,5'-dimethoxy-6,6'-bichromonyl monohydrate and 0.044 parts of sodium bicarbonate in 40 parts of water to give 0.12 parts of 2,2'-di-carboxy-5,5'-dimethoxy-6,6'-bichromonyl disodium salt as a white solid.

EXAMPLE 4

Bis-(7-benzyloxy-2-carboxychromon-6-yl) sulphide monohydrate

To a stirred solution of sodium ethoxide in ethanol, prepared from 0.5 parts of sodium and 20 parts of ethanol, was added a slurry of 1.28 parts of 3,3'-diacetyl-6,6'-dibenzyloxy-4,4'-dihydroxydiphenyl sulphide and 1.8 parts of diethyl oxalate in 10 parts of dioxan. The mixture was stirred and heated under reflux for 4 hours.

Water and diethyl ether were added, and the aqueous layer was collected and acidified with dilute hydrochloric acid. The aqueous layer was then extracted with ethyl acetate and, after drying over sodium sulphate, the ethyl acetate was evaporated to leave a brown oil. This oil was dissolved in boiling ethanol and 0.5 parts of concentrated hydrochloric acid were added. The solution was heated under reflux for 10 minutes. The solvent was removed under vacuum and the remaining oil was hydrolized with hot sodium bicarbonate solution.

This solution was cooled and acidified with dilute hydrochloric acid to give 0.31 parts of bis-(7-benzyloxy-2-carboxychromon-6-yl) sulphide monohydrate as a yellow solid, melting point 264°–6°C.

Analysis:
|  | Found: | C, 63.1; H, 3.94% |
|---|---|---|
| $C_{34}H_{22}O_{10}S \cdot H_2O$ requires: |  | C, 63.75; H, 3.75% |

The disodium salt was prepared from the above acid by freeze drying a solution of 0.3 parts of bis-(7-benzyloxy-2-carboxychromon-6-yl) sulphide monohydrate and 0.08 parts of sodium bicarbonate in 120 parts of water to give 0.3 parts of bis-(7-benzyloxy-2-carboxychromon-6-yl) sulphide disodium salt as a pale yellow solid.

EXAMPLE 5

2,2'-Dicarboxy-5,5',7,7'-tetramethoxy-8,8'-bichromonyl monohydrate a. 2-Ethoxycarbonyl-8-iodo-5,7-dimethoxy chromone To a stirred solution of sodium ethoxide, prepared from 4.6 parts of sodium and 100 parts of ethanol, was added a suspension of 9.8 parts of 3-iodo-2-hydroxy-4,6-dimethoxy-acetophenone in 18.3 parts of diethyl oxalate and 100 parts of dioxan. The mixture was heated under reflux for 4 hours, cooled, diluted with diethyl ether and extracted with water. The aqueous extracts were acidified with hydrochloric acid and extracted with chloroform. After washing with water the chloroform extracts were dried and evaporated to leave a red solid which was dissolved in 100 parts of boiling ethanol containing 3 parts of concentrated hydrochloric acid. 2-Ethoxycarbonyl-8-iodo-5,7-dimethoxy chromone was precipitated as a yellow powder on cooling, and was recrystallized from ethanol as yellow needles m.p. 208°–9°C.

Analysis:
|  | Found: | C, 41.8; H, 3.38; I, 31.6% |
|---|---|---|
| $C_{14}H_{13}IO_6$ requires: |  | C, 41.6; H, 3.22; I, 31.5% | b. 2,2'-Diethoxycarbonyl-5,5',7,7'-tetramethoxy-8,8'-dichromonyl

An intimate mixture of 4 parts of the 2-ethoxycarbonyl-8-iodo-5,7-dimethoxy chromone and 18 parts of copper bronze was heated at 220–230°C, for 4 hours, cooled and extracted with acetone. The acetone extracts were charcoaled, filtered and evaporated to give a solid which on recrystallization from ethyl acetate gave 2,2'-diethoxycarbonyl-5,5',7,7'-tetramethoxy-8,8'-bichromonyl as yellow needles, m.p. 242°–4C.

Analysis:
|  | Found: | C, 60.5; H, 4.71% |
|---|---|---|
| $C_{28}H_{26}O_{12}$ requires: |  | C, 60.65; H, 4.73% |

The structure was confirmed by mass spectroscopy.

c. 2,2'-Dicarboxy-5,5',7,7'-tetramethoxy-8,8'-bichromonyl monohydrate

The free acid was liberated from this product by adding to a solution of 0.2 parts of 2,2'-diethoxycarbonyl-5,5', 7,7'-tetramethoxy-8,8'-bichromonyl in ethanol 0.1 parts of sodium hydrogen carbonate. The mixture was heated to reflux temperature and water added until in complete solution. Refluxing was continued for 1 hour, followed by evaporation to remove ethanol, cooling and acidification with hydrochloric acid. The resulting solid comprising 2,2-dicarboxy 5,5', 7,7'-tetramethoxy-8,8'-bichromonyl monohydrate was filtered, washed with water, dried and recrystallized from ethanol as yellow needles, m.p. 258°–60°C.

Analysis:

$C_{24}H_{18}O_{12} \cdot H_2O$ requires:
Found: C, 55.8; H, 4.01%
C, 55.8; H, 3.90% d. 2,2'-Dicarboxy-5,5', 7,7'-tetramethoxy-8,8'-bichromonyl disodium salt 0.17 parts of 2,2'-dicarboxy-5,5', 7,7'-tetramethoxy-8,8'-bichromonyl monohydrate was treated with 0.055 parts of sodium hydrogen carbonate in water. The resulting solution was filtered and freeze-dried to give the disodium salt of 2,2'-dicarboxy-5,5', 7,7'-tetramethoxy-8,8'-bichromonyl.

EXAMPLE 6 a. 2,2'-Dicarboxy-7,7'-dimethoxy-8,8'-bichromonyl 2-Ethoxycarbonyl-8-iodo-7-hydroxychromone To a stirred suspension of 5.85 parts of 2-ethoxylcarbonyl-7-hydroxy chromone in 100 parts of ethanol, were added 2.54 parts of iodine and 0.88 parts of iodic acid dissolved in 5 parts of water. The mixture was stirred at room temperature for 4 hours and the precipitated solid was filtered off. The solid comprising 2-ethoxycarbonyl-8-iodo-7-hydroxy chromone was crystallized from ethanol as a white solid, m.p. 218°–9°C. The purity was determined by thin layer chromatography and the structure by nuclear magnetic resonance spectroscopy.

Analysis:

$C_{12}H_9IO_5$ requires:
Found: C, 40.3; H, 2.50; I, 34.8%
C, 40.0; H, 2.50; I, 35.3% b. 2-Ethoxycarbonyl-8-iodo-7-methoxy chromone

A solution of 4.7 parts of 2-ethoxycarbonyl-8-iodo-7-hydroxy chromone and 1.7 parts of dimethyl sulphate in 50 parts of acetone was refluxed and stirred with 2 parts of potassium carbonate for 4 hours. The mixture was cooled and poured onto 200 parts of water. The resulting solid comprising 2-ethoxycarbonyl-87-methoxy chromone was filtered off, washed with water, dried and crystallized from ethanol as a white solid, m.p. 154°–5°C.

Analysis:

$C_{13}H_{11}IO_5$ requires:
Found: C, 41.2; H, 2.99%
C, 41.7; H, 2.94% c. 2,2'-Diethoxycarbonyl-7,7'-dimethoxy-8,8'-bichromonyl

A mixture of 3.4 parts of 2-ethoxycarbonyl-8-iodo-7-methoxy chromone, 8 parts of copper powder and 30 parts of dimethylformamide was heated at 155°–165°C for 6 hours. The mixture was cooled and filtered, and, the residue washed with dimethyl formamide. The filtrate and washings were combined and poured in to 200 parts of water. The resulting precipitate comprising 2,2'-diethoxycarbonyl-7,7'-dimethoxy-8,8'-bichromonyl was filtered off and crystallized from ethanol as a yellow solid, m.p. 220°–1°C.

Analysis:

$C_{26}H_{22}O_{10}$ requires:
Found: C, 62.7; H, 4.45%
C, 63.15; H, 4.49%

The purity was determined by thin layer chromatography and the structure by nuclear magnetic resonance and mass spectrometry.

d. 2,2'-Dicarboxy-7,7'-dimethoxy-8,8'-bichromonyl.

To a solution of 0.4 parts of 2,2'-diethoxycarbonyl-7,7'-dimethoxy-8,8'-bichromonyl in 25 parts of ethanol were added 0.2 parts of sodium hydrogen carbonate. The mixture was heated to reflux temperature and water added until in solution when refluxing was continued for 1 hour. The solution was evaporated to remove ethanol, cooled and acidified with hydrochloric acid. The resulting solid comprising 2,2'-dicarboxy-7,7'-dimethoxy-8,8'-bichromonyl was filtered off, washed with water, dried and crystallized from ethanol to give a yellow solid, m.p. 296°–7°C.

Analysis:

$C_{22}H_{14}O_{10}$ requires:
Found: C, 59.6; H, 3.38%
C, 60.28; H, 3.22% e. 2,2'-Dicarboxy-7,7'-dimethoxy-8,8'-dichromonyl sodium salt

The product was converted into its disodium salt by treating 0.3 parts of 2,2'-dicarboxy-7,7'-dimethoxy-8,8'-bichromonyl with 0.12 parts of sodium hydrogen carbonate in water. The resulting solution was filtered and freeze-dried to give the disodium salt of 2,2'-dicarboxy-7,7'-dimethoxy-8,8'-bichromonyl.

EXAMPLE 7 a. 2,2'-Dicarboxy-6,6'-dimethoxy-5,5'-bichromonyl 2-Carboxy-6-hydroxychromone

To a stirred solution of sodium ethoxide prepared from 8.75 parts of sodium and 140 parts of ethanol was added a slurry of 23 parts of 2-hydroxy-5-benzyloxy acetophenone and 25 parts of diethyl oxalate. After heating for 30 minutes the mixture was cooled, acidified with glacial acetic acid, diluted with 750 parts of water and extracted with chloroform. The chloroform extracts were dried and evaporated to give a solid which was heated under reflux with 150 parts of glacial acetic acid and 30 parts of concentrated hydrochloric acid for 12 hours. To the resulting cooled solution were added 300 parts of water and the solid obtained was filtered off, dissolved in sodium bicarbonate solution and acidified to give 12.1 parts of 2-carboxy-6-hydroxy-chromone, m.p. 297°–9°C.

Analysis:

$C_{10}H_6O_5$ requires:
Found: C, 57.75; H, 3.06%
C, 58.26; H, 2.93% b. 2-Ethoxycarbonyl-6-hydroxychromone

A solution of 8 parts of the 2-carboxy-6-hydroxy-chromone, 60 parts of ethanol and 1 part of concentrated sulphuric acid in 100 parts of dry benzene were refluxed for 24 hours.

The benzene and excess ethanol were then distilled and the resulting oil on dilution with water gave 2-ethoxycarbonyl-6-hydroxychromone which was filtered off, washed with sodium bicarbonate solution, dried and crystallized from ethanol to give 5.5 parts of a yellow solid, m.p. 209°–11°C. The purity was confirmed by thin layer chromatography.

c. 2-Ethoxycarbonyl-5-iodo-6-hydroxychromone

To a stirred warm solution of 2.34 parts of the 2-ethoxycarbonyl-6-hydroxychromone in ethanol were added 1.01 parts of iodine and 0.35 parts of iodic acid dissolved in 5 parts of water. After stirring for 5 hours at room temperature the mixture was evaporated, the resulting solid collected, washed with sodium thiosulphate solution, dried and crystallized from ethanol to give 2 parts of 2-ethoxycarbonyl-5-iodo-6-hydroxychromone, m.p. 170°–1°C as yellow needles.

Analysis:

$C_{12}H_9IO_5$ requires:
Found: C, 40.8; H, 2.62; I, 35.4%
C, 40.0; H, 2.50; I, 35.3%

The structure was confirmed by nuclear magnetic resonance spectroscopy.

d. 2-Ethoxycarbonyl-5-iodo-6-methoxychromone

To a stirred solution of the 7.2 parts of 2-ethoxycarbonyl-5-iodo-6-hydroxychromone and 2.6 parts of dimethyl sulphate in 50 parts of acetone were added 2.8 parts of potassium carbonate. The mixture was refluxed for 4 hours, cooled, poured into 200 parts of water, filtered and the resulting 2-ethoxycarbonyl-5-iodo-6-methoxychromone (5.5 parts) was crystallized from ethanol as yellow needles, m.p. 168°–9°C.

Analysis:

|  | Found: | C, 41.5; H, 3.0% |
|---|---|---|
| $C_{13}H_{11}IO_5$ requires: | | C, 41.7; H, 2.94% |

The structure was confirmed by nuclear magnetic resonance spectroscopy.

e. 2,2'-Diethoxycarbonyl-6,6'-dimethoxy-5,5'-bichromonyl

To a solution of 4 parts of the 2-ethoxycarbonyl-5-iodo-6-methoxychromone in 35 parts of dimethyl formamide were added 10 parts of copper bronze. After heating for 6 hours at 150°–160°C the mixture was cooled, filtered and diluted with water. The resulting solid was filtered off, washed, dried and crystallized from ethyl acetate to give 0.3 parts of 2,2'-diethoxycarbonyl-6,6'-dimethoxy-5,5'-bichromonyl as yellow needles, m.p. 243°–4°C Analysis:

|  | Found: | C, 63.6; H, 4.35% |
|---|---|---|
| $C_{25}H_{22}O_{10}$ requires: | | C, 63.15; H, 4.49% |

The structure was confirmed by mass and nuclear magnetic resonance spectroscopy.

f. 2,2'-Dicarboxy-6,6'-dimethoxy-5,5'-bichromonyl

To a solution of 0.3 parts of the 2,2'-diethoxycarbonyl-6,6'-dimethoxy-5,5'-bichromonyl in ethanol were added 0.15 parts of sodium hydrogen carbonate. The mixture was heated to reflux temperature and water was gradually added until complete solution occurred. Refluxing was then continued for 1 hour. The solution was evaporated to remove ethanol, filtered, cooled and acidified with hydrochloric acid. The resulting 0.23 parts of 2,2'-dicarboxy-6,6'-dimethoxy-5,5'-bichromonyl were filtered off, washed with water and dried, m.p. 303°C.

Analysis:

|  | Found: | C, 60.6; H, 3.28% |
|---|---|---|
| $C_{22}H_{14}O_{10}$ requires: | | C, 60.2; H, 3.19% | g. 2,2'-Dicarboxy-6,6'-dimethoxy-5,5'-bichromonyl disodium salt 0.2 parts of the 2,2'-dicarboxy-6,6'-dimethoxy-5,5'-bichromonyl were treated with 0.09 parts of sodium hydrogen carbonate in water. The resulting solution was freeze dried to give 0.2 parts of the disodium salt of 2,2'-dicarboxy-6,6'-dimethoxy-5,5'-bichromonyl.

EXAMPLE 8 a. Bis-(2-carboxy-5-methoxychromon-8-yl) sulphide dihydrate

To a stirred solution of sodium ethoxide in ethanol, prepared from 1.84 parts of sodium and 80 parts of ethanol, was added a slurry of 3.62 parts of 3,3'-diacetyl-2,2'-dihydroxy-4,4'-dimethoxydiphenyl sulphide and 7.3 parts of diethyl oxalate in 80 parts of dioxan. The mixture was stirred and heated under reflux for 16 hours.

Diethyl ether and water were then added and the aqueous layer was separated off and acidified with dilute hydrochloric acid. The precipitated oil was extracted with ethyl acetate and the organic solution was dried over anhydrous sodium sulphate, filtered and evaporated. The residual oil was dissolved in boiling ethanol and 0.5 parts of concentrated hydrochloric acid were added. The solution was heated under reflux for 15 minutes and was then allowed to cool.

The yellow solid which crystallized was filtered, dried and was then dissolved in a warm aqueous solution of sodium bicarbonate. The solution was treated with charcoal, filtered and acidified with dilute hydrochloric acid. The precipitated solid was filtered off, washed with water and crystallized from dioxan to give 2.5 parts of bis-(2-carboxy-5-methoxychromon-8-yl) sulphide dihydrate as a yellow solid, melting point 270°–2°C.

Analysis:

|  | Found: | C,52.07; H,3.37; S,6.09% |
|---|---|---|
| $C_{22}H_{14}O_{10}S\cdot 2H_2O$ requires: | | C,52.10; H,3.55; S,6.31% | b. Bis-(2-carboxy-5-methoxychromon-8-yl)sulphide disodium salt

A solution of 0.592 parts of the bis-(2-carboxy-5-methoxychromon-8-yl) sulphide dihydrate and 0.197 parts of sodium bicarbonate in 35 parts of water was filtered and freeze dried to give 0.55 parts of bis-(2-carboxy-5-methoxychromon-8-yl) sulphide disodium salt as a yellow solid.

EXAMPLE 9 a. Bis-(2-carboxychromon-6-yl) sulphide monohydrate

The method of Example 8 (a) was repeated using 1.14 parts of 3,3'-diacetyl-4,4'-dihydroxydiphenyl sulphide and 2.78 parts of diethyl oxalate to give 0.7 parts of bis-(2-carboxychromon-6-yl) sulphide monohydrate as a yellow solid, melting point 268°–70°C.

Analysis:

|  | Found: | C, 55.9; H, 3.14; S, 7.47% |
|---|---|---|
| $C_{20}H_{10}O_8S\cdot H_2O$ requires: | | C, 56.0; H, 2.8; S, 7.5% | b. Bis-(2-carboxychromon-6-yl) sulphide disodium salt

A solution of 0.521 parts of the bis-(2-carboxychromon-6-yl) sulphide monohydrate and 0.205 parts of sodium bicarbonate in 100 parts of water was filtered and freeze-dried to give 0.500 parts of bis-(2-carboxychromon-6-yl) sulphide disodium salt as a yellow solid.

EXAMPLE 10 a. Bis-(2-carboxy-7-methoxychromon-6-yl) sulphide monohydrate

The method of Example 8 a was repeated using 1.81 parts of 5,5'-diacetyl-4,4'-dihydroxy-2,2'-dimethoxydiphenyl sulphide and 3.65 parts of diethyl oxalate to give 0.6 parts of bis-(2-carboxy-7-methoxychromon-6-yl) sulphide monohydrate as a yellow solid, melting point 272°–5°C (decomposition).

Analysis:

|  | Found: | C, 54.5; H, 3.34; S. 6.84% |
|---|---|---|
| $C_{22}H_{14}O_{10}S\cdot H_2O$ requires: | | C, 54.1; H, 3.28; S, 6.55% | b. Bis-(2-carboxy-7-methoxychromon-6-yl) sulphide disodium salt

A solution of 0.433 parts of the bis-(2-carboxy-7-methoxychromon-6-yl) sulphide monohydrate and 0.149 parts of sodium bicarbonate in 150 parts of water was filtered and freeze dried to give 0.42 parts of bis-(2-carboxy-7-methoxychromon-6-yl) sulphide disodium salt as a yellow solid.

EXAMPLE 11 a. Bis-(2-carboxy-7-methoxychromon-6-yl) sulphone monohydrate

To a suspension of 0.5 parts of bis-(2-carboxy-7-methoxychromon-6-yl) sulphide monohydrate (produced as in Example 10 a) in 50 parts of glacial acetic acid were added 2.2 parts of 30% w/v hydrogen peroxide. The mixture was heated under reflux for 30 minutes and was then allowed to cool. The solid which crystallized was filtered off and dried to give 0.45 parts of bis-(2-carboxy-7-methoxychromon-6-yl) sulphone monohydrate as a white solid, melting point 283°–5°C.

Analysis:

$C_{22}H_{14}O_{12}S \cdot H_2O$ requires:
Found: C, 50.43; H, 3.06; S, 5.84%
C, 50.8; H, 3.08; S, 6.16% b. Bis-(2-carboxy-7-methoxychromon-6-yl) sulphone disodium salt

A solution of 0.46 parts of the bis-(2-carboxy-7-methoxychromon-6-yl) sulphone monohydrate and 0.15 parts of sodium bicarbonate in 80 parts of water was filtered and freeze dried to give 0.37 parts of bis-(2-carboxy-7-methoxychromon-6-yl) sulphone disodium salt as a white solid.

EXAMPLE 12 a. 2,2'-Dicarboxy-7,7'-bichromonyl sesquihydrate Ethyl-7-iodochromone-2-carboxylate To a stirred solution of sodium ethoxide in ethanol, prepared from 1.5 parts of sodium in 30 parts of ethanol, was added a slurry of 4.25 parts of 2-hydroxy-4-iodoacetophenone and 5.9 parts of diethyl oxalate in 30 parts of diethyl ether. The mixture was stirred and heated under gentle reflux for 4 hours.

Water and diethyl ether were added and the aqueous layer was acidified with concentrated hydrochloric acid. The solution was extracted with ethyl acetate. The ethyl acetate solution was dried over sodium sulphate, filtered and evaporated to leave a red oil.

This oil was dissolved in boiling ethanol containing 0.5 parts of concentrated hydrochloric acid and the solution was heated under reflux for 10 minutes. On cooling, a solid crystallized. This was washed with sodium bicarbonate solution. The insoluble solid was crystallized from ethanol to give 0.85 parts of ethyl 7-iodochromone-2-carboxylate, melting point 145°–6°C, as pale yellow needles.

Analysis:

$C_{12}H_9IO_4$ requires:
Found: C, 42.6; H, 2.33%
C, 41.9; H, 2.6%

The above sodium bicarbonate solution was acidified with dilute hydrochloric acid to give 2.75 parts of 7-iodochromone-2-carboxylic acid, melting point 251°–2°C as a colorless solid.

Analysis:

$C_{10}H_5IO_4$ requires:
Found: C, 37.61; H, 1.35; I, 40.54%
C, 37.97; H, 1.58; I, 40.19% b 2,2'-Diethoxycarbonyl-7,7'-bichromonyl

A mixture of 3.44 parts of the ethyl 7-iodochromone-2-carboxylate and 8.0 parts of copper bronze in 30 parts of dimethylformamide was heated between 155°–60°C for 6 hours. The mixture was then filtered while hot and the solid was washed with 10 parts of warm dimethylformamide.

The solution was poured into 300 parts of water to give a buff colored precipitate. This was crystallized from an ethanol-dioxan mixture to give a buff colored solid. Recrystallization from ethyl acetate gave 0.3 parts of 2,2'-diethoxycarbonyl-7,7'-bichromonyl, melting point 224°–6°C, as buff colored micro-needles.

Analysis:

$C_{22}H_{18}O_8$ requires:
Found: C, 66.32; H, 4.17%
C, 66,36; H, 4.18% c. 2,2'-Dicarboxy-7,7'-bichromonyl sesquihydrate

A solution of 0.5 parts of the 2,2'-diethoxycarbonyl-7,7'-bichromonyl in ethanol and water was treated with an excess of sodium bicarbonate. The solution was heated in an open vessel till thin layer chromatography showed complete hydrolysis of the ester.

The solution was then cooled, treated with charcoal, filtered and acidified with concentrated hydrochloric acid to give a gelatinous precipitate. The mixture was centrifuged and the supernatant liquid was poured off. The gel was triturated with hot ethanol to give 0.3 parts of 2,2'-dicarboxy-7,7'-bichromonyl sesquihydrate, melting point 291°–3°C, as a colorless solid.

Analysis:

$C_{20}H_{10}O_8 \cdot 1\frac{1}{2}H_2O$ requires:
Found: C, 59.22; H, 2.97%
C, 59.26; H, 3.21% d. 2,2'-Dicarboxy-7,7'-bichromonyl disodium salt

A solution of 0.24 parts of the 2,2'-dicarboxy-7,7'-bichromonyl sesquihydrate and 0.1 parts of sodium bicarbonate in 40 parts of water was freeze-dried to give 0.24 parts of 2,2'-dicarboxy-7,7'-bichromonyl disodium salt as a pale yellow solid.

EXAMPLE 13 a Bis-(2-carboxychromon-6-yl)ether sesquihydrate 4,4'-Diacetoxydiphenyl ether.

To a mixture of 12.6 parts of 4,4'-dihydroxydiphenyl ether and 25 parts of acetic anhydride were added 0.5 parts of concentrated sulphuric acid. The mixture was heated at 100°C for 45 minutes and was then poured on to 100 parts of crushed ice. The precipitated solid was filtered off, washed with water, and crystallized from aqueous ethanol to give 14.6 parts of 4,4'-diacetoxydiphenyl ether as yellow plates, melting point 110°–112°C.

Analysis:

$C_{16}H_{14}O_5$ requires:
Found: C, 66.96; H, 4.82%
C, 67.12; H, 4.93% b. 3,3'-Diacetyl-4,4'-dihydroxydiphenyl ether

A mixture of 7.83 parts of the 4,4'-diacetoxydiphenyl ether, 4.16 parts of sodium chloride and 21.9 parts of aluminum chloride was heated to 145°C and maintained at that temperature for 2 hours. After cooling, the resulting hard solid was broken up and decomposed by the addition of 250 parts of water. The remaining solid was filtered off, suspended in boiling water for 5 minutes and filtered off again. The solid was crystallized from ethanol to give 6.11 parts of 3,3'-diacetyl-4,4'-dihydroxydiphenyl ether as a light brown solid, melting point 181°–3C.

Analysis:

$C_{16}H_{14}O_5$ requires:
Found: C, 67.12; H, 4.87%
C, 67.12; H, 4.93% c. Bis-(2-carboxychromon-6-yl) ether sesquihydrate

To a stirred solution of sodium ethoxide in ethanol, prepared from 1.84 parts of sodium and 30 parts of ethanol, were added 60 parts of diethyl ether followed by a slurry of 2.86 parts of the 3,3'-diacetyl-4,4'-dihydroxydiphenyl ether and 7.3 parts of diethyl oxalate in 30 parts of ethanol. The mixture was stirred and heated under gentle reflux for 4.5 hours.

Diethyl ether and water were then added and the aqueous layer was separated and acidified with dilute hydrochloric acid. The precipitated oil was extracted with ethyl acetate and the organic solution was dried over anhydrous sodium sulphate, filtered and evaporated. The residual oil was dissolved in boiling ethanol and 0.5 parts of concentrated hydrochloric acid were added. The solution was heated under reflux for 15 minutes and was then allowed to cool. The brown solid which crystallized was dissolved in an aqueous solution of sodium bicarbonate and the solution was heated on a steam bath for 2.5 hours. After cooling, the solution was filtered and acidified with dilute hydrochloric acid. The light brown precipitate was filtered off, washed with water and dried to give 0.4 parts of bis-(2-carboxychromon-6-yl) ether sesquihydrate, melting point 280°–1°C.

Analysis:
$C_{20}H_{10}O_9 \cdot 1\frac{1}{2}H_2O$ requires:
Found: C, 56.7; H, 3.15%
C, 57.0; H, 3.09% d. Bis-(2-carboxychromon-6-yl) ether disodium salt

A solution of 0.55 parts of the bis-(2-carboxychromon-6-yl) ether sesquihydrate and 0.22 parts of sodium bicarbonate in 150 parts of water was filtered and freeze dried to give 0.5 parts of bis-(2-carboxychromon-6-yl) ether disodium salt as a buff solid.

EXAMPLE 14 a. Bis-(2-carboxy-5-methoxychromon-8-yl) sulphone hemihydrate

The method of Example 11 (a) was repeated usuing 0.9 parts of bis-(2-carboxy-5-methoxychromon-8-yl) sulphide dihydrate (prepared as in Example 8 (a)) and 3.96 parts of 30% w/v hydrogen peroxide to give 0.5 parts of bis-(2-carboxy-5-methoxychromon-8-yl) sulphone hemihydrate as a white solid, melting point 280°–3°C.

Analysis;
$C_{22}H_{14}O_{12}S \cdot \frac{1}{2}H_2O$ requires:
Found: C, 51.41; H, 2.72; S, 6.22%
C, 51.6; H, 2.93; S, 6.25% b. Bis-(2-carboxy-5-methoxychromon-8-yl) sulphone disodium salt

A solution of 0.4 parts of the bis-(2-carboxy-5-methoxychromon-8-yl) sulphone hemihydrate and 0.134 parts of sodium bicarbonate in 35 parts of water was filtered and freeze dried to give 0.38 parts of bis-(2-carboxy-5-methoxychromon-8-yl) sulphone disodium salt as a white solid.

EXAMPLE 15 a. 6,6'-Dibromo-2,2'-dicarboxy-8,8'-bichromonyl 5-Bromo-2-hydroxy-3-iodoacetophenone.

A solution of 11.25 parts of 5-bromo-2-hydroxyacetophenone and 5.08 parts of iodine in 50 parts of ethanol was treated dropwise with a solution of 1.76 parts of iodic acid in 10 parts of water. The solution was heated on the steam bath for 1½ hours and then poured into water containing some sodium metabisulphite.

A pale yellow solid was precipitated which was crystallized from ethanol to give 12.2 parts of 5-bromo-2-hydroxy-3-iodoacetophenone as pale yellow needles, melting point 116°C.

Analysis:
$C_8H_6BrIO_2$ requires:
Found: C, 28.06; H, 1.85; I, 36.8%
C, 28.15; H, 1.76; I, 37.24% b. Ethyl 6-bromo-8-iodochromone-2-carboxylate

To a stirred solution of sodium ethoxide in dry ethanol, prepared from 4.13 parts of sodium and 100 parts of dry ethanol, was added a slurry of 15.2 parts of the 5-bromo-2-hydroxy-3-iodoacetophenone and 16.3 parts of diethyl oxalate in 50 parts of dry ethanol. The mixture was stirred and heated under reflux for 4 hours.

The mixture was poured into a separating funnel containing ethyl acetate and dilute hydrochloric acid. The ethyl acetate layer was dried over sodium sulphate, filtered and evaporated to leave a brown oil. This oil was dissolved in boiling ethanol containing 0.5 parts of concentrated hydrochloric acid. The solution was boiled for 5 minutes and allowed to cool, whence a yellow solid crystallized.

This solid was recrystallized from ethanol to give 12.7 parts of ethyl 6-bromo-8-iodochromone-2-carboxylate as buff colored needles, melting point 156°–8°C.

Analysis:
$C_{12}H_8BrIO_4$ requires:
Found: C, 33.9; H, 2.0; I, 30.2%
C, 34.04; H, 1.89; I, 30.02% c. 6,6'-Dibromo-2,2'-diethoxycarbonyl-8,8'-bichromonyl

A mixture of 3.44 parts of the ethyl 6-bromo-8-iodochromone-2-carboxylate and 8.0 parts of copper bronze in 30 parts of dimethylformamide was heated at 155°–65°C for 6 hours. The solid was filtered off and washed with 15 parts of hot dimethylformamide.

Water was added to the filtrate and the buff precipitate was filtered off. This solid was crystallized from ethyl acetate to give 0.3 parts of 6,6'-dibromo-2,2'-diethoxycarbonyl- 8,8'-bichromonyl as pale yellow micro-needles, melting point 217°–220°C.

Analysis:
$C_{24}H_{16}Br_2O_8$ requires:
Found: C, 48.3; H, 2.7%
C, 48.65; H, 2.7% d. 6,6'-Dibromo-2,2'-dicarboxy-8,8'-bichromonyl

A mixture of 0.48 parts of the 6,6'-dibromo-2,2'-diethoxycarbonyl-8,8'-bichromonyl and 0.5 parts of sodium bicarbonate in aqueous ethanol was heated till thin layer chromatography showed complete hydrolysis of the ester. The solution was filtered, cooled and acidified with dilute hydrochloric acid to give a gelatinous precipitate. On warming the mixture, the gel broke up to give a more solid precipitate. This solid was filtered off and crystallized from dioxan to give 0.25 parts of 6,6'-dibromo-2,2'-dicarboxy-8,8'-bichromonyl as a colorless solid, melting point 334°–6°C.

Analysis:
$C_{20}H_8Br_2O_8$ requires:
Found: C, 44.8; H, 1.72%
C, 44.78; H, 1.49% e. 6,6'-Dibromo-2,2'-dicarboxy-8,8'bichromonyl disodium salt

A solution of 0.176 parts of the 6,6'-dibromo-2,2'-dicarboxy-8,8'-bichromonyl and 0.056 parts of sodium bicarbonate in 50 parts of water was treated with charcoal, filtered and freeze dried to give 0.17 parts of 6,6'-dibromo-2,2'-dicarboxy-8,8'-bichromonyl disodium salt as a pale yellow solid.

EXAMPLE 16 a. 2,2'-Bis-(2-carboxychromon-6yl) acetic acid dihydrate 2,2-Bis-(4-methoxyphenyl) acetic acid methyl ester To a solution of 40 parts of 2,2-bis-(4-hydroxyphenyl) acetic acid and 67 parts of dimethyl sulphate in 900 parts of acetone were added 70 parts of potassium carbonate. The mixture was heated at reflux temperature with stirring for 12 hours. It was then cooled and poured into water.

The resulting oil was extracted into ether, and the ethereal solution was washed with water, dried over sodium sulphate and evaporated to give an oil. The oil, which solidified on cooling, was crystallized from methanol to give 40 parts of 2,2-bis-(4-methoxyphenyl) acetic acid methyl esteras white needles, melting point 65° C.

Analysis:
$C_{17}H_{18}O_4$ requires:
Found: C, 71.8; H, 6.39%
C, 71.3; H, 6.30% b. 2,2-bis-(3-acetyl-4-hydroxyphenyl)acetic acid

To a stirred solution of 38 parts of the 2,2-bis-(4-methoxyphenyl) acetic acid methyl ester and 21.5 parts of acetyl chloride in 600 parts of carbon disulphide were added 78 parts of aluminum chloride at room temperature. The mixture was refluxed for 6 hours and cooled. The carbon disulphide was removed by decantation and the residue was hydrolized with ice and hydrochloric acid and extracted with diethyl ether. The ethereal solution was extracted with sodium hydroxide solution. The alkaline extracts were acidified with hydrochloric acid and extracted with diethyl ether.

The ethereal extracts were washed with water, dried over sodium sulphate, filtered and evaporated to give a semi-solid which was triturated with benzene. The resulting solid was crystallized from ethanol to give 9 parts of 2,2-bis-(3-acetyl-4-hydroxphenyl)acetic acid, m.p. 213°–5°C.

The structure was confirmed by nuclear magnetic resonance and mass spectroscopy.

Analysis:

|  | Found: |
|---|---|
| $C_{18}H_{16}O_6$ requires: | C, 65.24; H, 4.81% |
|  | C, 65.85; H, 4.88% | c. Ethyl 2,2-bis-(3-acetyl-4-hydroxyphenyl)acetate

A solution of 17 parts of the 2,2-bis-(3-acetyl-4-hydroxyphenyl) acetic acid and 2 parts of concentrated sulphuric acid in 300 parts of ethanol was refluxed for 18 hours. The ethanol was evaporated to give an oil which was dissolved in diethyl ether. The ethereal solution was washed with water, sodium bicarbonate solution, and water, dried over sodium sulphate, filtered and evaporated to yield an oil which solidified on cooling. Crystallization from ethanol gave ethyl 2,2-bis-(3-acetyl-4-hydroxyphenyl) acetate, m.p. 93°–4°C.

Analysis:

|  | Found: |
|---|---|
| $C_{20}H_{20}O_6$ requires: | C, 67.71; H, 5.46% |
|  | C, 67.4; H, 5.62% | d. Ethyl 2,2-bis-(2-ethoxy carbonylchromon-8-yl) acetate

To a stirred solution of sodium sodium ethoxide in ethanol prepared from 3.68 parts of sodium and 200 parts of ethanol, was added a solution of 7 parts of ethyl 2,2-bis(3-acetyl-4-hydroxyphenyl)acetate an 14.6 parts of diethyl oxalate, in 150 parts of dioxan at room temperature. The mixture was heated at reflux temperature for 5 hours, cooled and poured into water.

The resulting solution was extracted with diethyl ether and separated. The aqueous phase was acidified with hydrochloric acid and extracted with diethyl ether. The ethereal solution was washed with water, dried over sodium sulphate, filtered and evaporated to give an oil, which was boiled with ethanol and 2 drops of concentrated hydrochloric acid. The solid, which precipitated on cooling, was filtered and crystallized from ethanol to give 3.2 parts of ethyl 2,2-bis (2-ethoxycarbonylchromon-6yl) acetate as a solid, m.p. 152°–4°C. The structure was confirmed by mass spectroscopy.

Analysis:

|  | Found: |
|---|---|
| $C_{28}H_{24}O_{10}$ requires: | C, 64.03; H, 4.54% |
|  | C, 64.60; H, 4.61% | e. 2,2-bis-(2-carboxychromon-6-yl) acetic acid dihydrate

A solution of 2.6 parts of ethyl 2,2-bis-(2-ethoxycarbonylchromon-6-yl) acetate in 12.8 parts of 1.17N sodium hydroxide solution in methanol was refluxed for 2 hours. After cooling, the solution was acidified with hydrochloric acid. The resulting solid was filtered off, washed with ethanol, dried and crystallized twice from dioxan to give 0.5 parts of 2,2-bis-(2-carboxychromon-6-yl) acetic acid dihydrate as a white solid Analysis:

|  | Found: |
|---|---|
| $C_{22}H_{12}O_{10}\cdot 2H_2O$ requires: | C, 55.8; H, 3.32% |
|  | C, 55.9; H, 3.39% | f. 2,2-Bis-(2-carboxychromon-6-yl) acetic acid trisodium salt 0.21 parts of 2,2-bis-(2-carboxychromon-6-yl) acetic acid dihydrate were treated with 0.113 parts of sodium hydrogen carbonate dissolved in 50 parts of water. The resulting solution was filtered and freeze dried to give the trisodium salt of 2,2-bis-(2-carboxychromon-6-yl) acetic acid.

EXAMPLE 17 a. Ethyl 2,2-bis-(2-carboxychromon-6-yl) acetate to a solution of 1 part of ethyl 2,2-bis(2-ethoxycarbonylchromon-6-yl) acetate (prepared as in Example 16(d)) in ethanol were added 0.35 parts of sodium hydrogen carbonate. The mixture was boiled, and water was added until a clear solution was obtained, The solution was boiled for 1 hour, evaporated to remove ethanol, cooled and acidified with hydrochloric acid. The resulting solid was filtered, washed with water, dried and crystallized three times from ethyl acetate to give 0.4 parts of ethyl 2,2-bis-(2-carboxychromon-6-yl) acetate as a solid, m.p. 278°–81°C. The structure was confirmed by nuclear magnetic resonance spectroscopy.

Analysis:

|  | Found: |
|---|---|
| $C_{24}H_{16}O_{10}$ requires: | C, 61.83; H, 3.68% |
|  | C, 62.07; H, 3.45% | b. Ethyl 2,2-bis (2-carboxychromon-6-yl) acetate disodium salt 0.464 parts of ethyl 2,2-bis-(2-carboxychromon-6-yl) acetate were treated with 0.168 parts of sodium hydrogen carbonate dissolved in 50 parts of water. The resulting solution was filtered freeze dried to give the disodium salt of ethyl 2,2bis-(2-carboxychromon-6-yl) acetate.

EXAMPLE 18 a. 1,2-Bis-(2-carboxychromon-6-yl)-2,2-dichloroethylene a. 1,1-Bis-(3-acetyl-4-hydroxyphenyl)-2,2-dichloroethylene To a stirred solution of 13.9 parts of 1,1 bis-(p-methoxyphenyl)-2,2,2-trichloroethane and 6.28 parts of acetyl chloride in 200 parts of carbon disulphide, were slowly added 21.8 parts of anhydrous aluminum chloride. The mixture was heated at reflux temperature for 24 hours, cooled and the carbon disulphide was decanted. The residue was hydrolized with ice and hydrochloric acid, extracted with diethyl ether and the ethereal solution was then extracted with sodium hydroxide solution. The alkaline extracts were acidified with hydrochloric acid, extracted with diethyl ether and the ethereal extracts were washed with water, dried over sodium sulphate and evaporated to give a brown solid, which was continuously extracted with petroleum ether (b.pt. 60°–80°C) for 3 days using a Soxhlet apparatus. Evaporation of the petroleum ether solution gave a yellow solid, which was crystallized from ethanol, to give 4.3 parts of 1,1 bis-(3-acetyl-4-hydroxyphenyl)-2,2-dichloroethylene, m.p. 168°–170°C. The structure was confirmed by nuclear magnetic resonance and mass spectroscopy and its purity was determined by thin layer chromatography.

Analysis:

|  | Found: |
|---|---|
| $C_{18}H_{14}Cl_2O_4$ requires: | C, 59.4; H, 3.74% |
|  | C, 59.2; H, 3.83% | b. 1,1-Bis-(22-carboxychromon-6-yl)-2,2-dichloroethylene

To a stirred solution of sodium ethoxide in ethanol prepared from 2.1 parts of sodium and 100 parts of ethanol was added a solution of 4.2 parts of 1,1-bis-(3-acetyl-4-hydroxyphenyl)-2,2-dichloroethylene and 8.75 parts of diethyl oxalate in 100 parts of dioxan at room temperature. The mixture was heated at reflux temperature for 5 hours, cooled, poured into water and extracted with diethyl ether. The aqueous phase was acidified with hydrochloric acid and extracted with diethyl ether. The ether extracts were washed with water, dried over sodium sulphate and evaporated to give a yellow oil, which was dissolved in ethanol and 2 drops of concentrated hydrochloric acid and boiled for 15 minutes. The ethanol was then evaporated off and the resulting oil was redissolved in ethanol and treated with an excess of sodium hydrogen carbonate. The mixture was boiled and water was added until a clear solution was obtained. After boiling the solution for 30 minutes, the ethanol was evaporated off and the aqueous solution was acidified with hydrochloric acid. The resulting solid was filtered off, washed with water, dried and crystallized twice from ethanol to give 1.1 parts of 1,1-bis-(2-carboxychromon-6-yl)-2,2-dichloroethylene as a white solid, m.p. 304°–5C. The structure was confirmed by nuclear magnetic resonance spectroscopy.

Analysis:
$C_{22}H_{10}Cl_2O_8$ requires:
Found: C, 56.42; H, 2.25%
C, 55.81; H, 2.11% c. 1,1-Bis-(2-carboxychromon-6-yl)-2,2-dichloroethylene disodium salt 0.473 parts of 1,1-bis-(2-carboxychromon-6-yl)-2,2-dichloroethylene were treated with 0.168 parts of sodium hydrogen carbonate in 50 parts of water. The resulting solution was filtered and freeze dried to give the disodium salt of 1,1-bis-(2-carboxychromon-6-yl)-2,2-dichloroethylene

EXAMPLE 19 a. Bis-(2-carboxychromon6-yl) methane Bis-(3-acetyl-4-hydroxyphenyl) methane

A mixture of 14.2 parts of bis-(4-acetoxyphenyl) methane, 21.7 parts of aluminum chloride and 9 parts of sodium chloride was heated for 4 hours at 140°–150°C. After cooling the mixture was hydrolized with ice and hydrochloric acid and extracted with ethyl acetate. The ethyl acetate solution was extracted with dilute sodium hydroxide solution which was then acidified with hydrochloric acid and extracted with ethyl acetate. The ethyl acetate solution was washed with water, dried over sodium sulphate and evaporated to give a solid which was crystallized from ethanol and recrystallized from dioxan to yield 4 parts of bis-(3-acetyl-4-hydroxyphenyl) methane as a white solid, m.p. 156°–7°C. The purity was checked by thin layer chromatography and the structure by nuclear magnetic resonance spectroscopy.

Analysis:
$C_{17}H_{16}O_4$ requires:
Found: C, 72.4; H, 5.94%
C, 71.9; H, 5.63% b. B-(2-ethoxycarbonylchromon-6-yl) methane hydrate

To a stirred solution of sodium ethoxide in ethanol prepared from 0.65 parts of sodium and 20 parts of ethanol was added a solution of 1.9 parts of bis-(3-acetyl-4-hydroxy-phenyl) methane and 1.8 parts of diethyl oxalate in 50 parts of dioxan. The mixture was stirred at room temperature for 30 minutes and at reflux temperature for 24 hours.

After cooling, the solution was poured into water and extracted with diethyl ether. The aqueous extracts were acidified with concentrated hydrochloric acid and extracted with diethyl ether. The ethereal solution was washed with water, dried over sodium sulphate and evaporated to yield an oil which was refluxed for 10 minutes in ethanol with 2 drops of concentrated hydrochloric acid. Bis-(2-ethoxycarbonylchromon-6-yl) methane hydrate was precipitated on cooling and this was recrystallized from ethanol to give 0.8 parts of a white solid, m.p. 183°–5°C. The structure was confirmed by mass spectroscopy.

Analysis:
$C_{25}H_{20}O_8 \cdot H_2O$ requires:
Found C, 64.5; H, 4.50%
C, 64.4; H, 4.72% c. Bis-(2-carboxychromon-6-yl) methane

To a solution of 0.4 parts of bis-(2ethoxy-carbonylchromon-6-yl) methane hydrate in ethanol were added 0.2 parts of sodium hydrogen carbonate. The mixture was heated to reflux temperature and water was added until homogeneous. Refluxing was continued for 1 hour. The solution was evaporated to remove ethanol, cooled and acidified with hydrochloric acid. The precipitate was filtered off, washed with water, dried and crystallized from ethanol to give 0.2 parts of bis-(2-carboxychromon-6-yl) methane as a while solid, m.p. 295°–6°C.

Analysis:
$C_{21}H_{12}O_8$ requires:
Found: C, 63.8; H, 3.21%
C, 64.28; H, 3.06% d. Bis-(2-carboxychromon-6-yl) methane disodium salt 0.2 parts of bis-(2-carboxychromon-6-yl) methane were treated with 0.084 parts of sodium hydrogen carbonate in water. The resulting solution was filtered and freeze dried to give the disodium salt of bis-(2-carboxychromon-6-yl) methane.

EXAMPLE 20 a. Bis-(2-carboxychromon-6-yl)pyrid-2-yl methane hydrate Bis-(3-acetyl-4-hydroxyphenyl) pyrid-2-yl methane An intimate mixture consisting of 7.2 parts of bis-(4-acetoxyphenyl) pyrid-2-yl methane, 16.7 parts of aluminum chloride and 3.5 parts of sodium chloride was heated at 145°–160°C. for 3 hours. After cooling, the mixture was hydrolized with ice and hydrochloric acid and extracted with diethyl ether.

The aqueous phase was neutralized with sodium bicarbonate solution and extracted with diethyl ether. The ethereal extracts were washed with water, dried over sodium sulphate and evaporated to give an oil. The solid which formed when the oil was triturated with cold petroleum spirit (boiling range 40°–60C) was crystallized twice from petroleum spirit (boiling range 60°–80°C) to give 3 parts of bis-(3-acetyl-4hydroxyphenyl) pyrid-2-yl methane, m.p. 110°–113°C.

Analysis:
$C_{22}H_{19}NO_4$ requires:
Found C, 73.6; H, 5.35; N. 4.09%
C, 73.15; H, 5.26; N. 3.88% b. Bis-(2-ethoxycarbonylchromon-6-yl) pyrid-2-yl methane

To a stirred solution of sodium ethoxide prepared from 1 part of sodium and 20 parts of ethanol, was added a solution of 4 parts of bis-(3-acetyl-4-hydroxyphenyl) pyrid-2-yl methane and 3.2 parts of diethyl oxalate in 100 parts of dioxan.

The mixture was refluxed for 4 hours, cooled, poured into water and extracted with diethyl ether. The aqueous phase was then neutralized with dilute hydrochloric acid and extracted with diethyl ether. The ethereal solution was washed with water, dried over sodium sulphate and evaporated to give an oil, which was boiled for 5 minutes with 50 parts of ethanol containing 2 parts of concentrated hydrochloric acid.

The solution was cooled, diluted with water and basified with sodium bicarbonate solution. The resulting solid was filtered, washed, dried and crystallized from ethanol to give 2 parts of bis-(2-ethoxycarbonylchromon-6yl) pyrid-2-yl methane, m.p. 171°–3°C. The purity was confirmed by thin layer chromatography and the structure by mass spectrometry.

c. Bis-(2-carboxychromon-6-yl) pyrid-2-yl methane hydrate

To a solution of 1 part of bis-(2-ethoxycarbonylchromon-6-yl) pyrid-2-yl methane in 50 parts of ethanol was added 0.4 parts of sodium hydrogen carbonate. The mixture was boiled and water was added until a clear solution was obtained. After boiling the solution for 2 hours, the ethanol was evaporated off and the solution was cooled and neutralized with hydrochloric acid. The solid which precipitated was filtered off, washed with water and dried to give 0.3 parts of bis-(2-carboxychromon-6-yl) pyrid-2-yl methane hydrate m.p. 235°C.

Analysis:
$C_{26}H_{15}NO_9 \cdot H_2O$ requires:
Found: C,63.6; H,3.65; N,2.83%
C,64.06; H,3.49; N,2.88% d. Bis-(2-carboxychromon-6-yl) pyrid-2-yl methane disodium salt 0.243 parts of bis-(2-carboxychromon-6-yl) pyrid-2-yl methane hydrate were treated with 0.084 parts of sodium hydrogen carbonate dissolved in 50 parts of water. The resulting solution was filtered and freeze dried to give the disodium salt of bis-(2-carboxychromon-6-yl) pyrid-2-yl methane.

EXAMPLE 21

Bis- [2-carboxy-7-(2-hydroxypropoxy) chromon-8-yl] methane disodium salt a. Bis- [3-acetyl-2-hydroxy-6-(2-hydroxypropoxy) phenyl] methane A mixture of 2.7 parts of bis-(3-acetyl-2,6-dihydroxy-phenyl) methane, 3.5 parts of propylene oxide and 4 drops of Triton B(benzyl trimethylammonium hydroxide)was dissolved in dioxan and heated in a pressure bottle at 100°C for 72 hours. A further 4 parts of propylene oxide were added and the solution was heated for a further 16 hours. Evaporation of the dioxan followed by chromatography of the crude residue on silica gel gave 0.8 parts of bis-[3-acetyl-2-hydroxy-6-(2-hydroxypropoxy) phenyl] methane, m.p. 166°–7°C from ethanol.

Analysis:
Found: C, 63.2; H, 6.3%
$C_{23}H_{28}O_8$ requires: C, 63.9; H, 6.5% b. Bis-[2-ethoxycarbonyl-7-(2-hydroxy propoxy)chromon-8-yl] methane

A solution of 1.6 parts bis[3-acetyl-2-hydroxy-6 (2-hydroxypropoxy) phenyl] methane and 3.5 parts of diethyl oxalate in 30 parts by volume of ethanol was added to a solution of 0.9 parts of sodium in 30 parts by volume of ethanol. The yellow mixture was refluxed for 4 hours. The solution was poured into 300 parts by volume of ether and the products were extracted with water. A solid, insoluble in water and ether, was filtered off. This solid was boiled with about 10 parts of ethanol containing 0.5 parts of hydrochloric acid for 10 minutes. The filtered solution gave, on cooling, 0.2 parts of bis- [2-ethoxycarbonyl-7-(2-hydroxypropoxy)chromon-8-yl] methane, m.p. 192°–4°C.

The original aqueous extracts were acidified and the products were extracted into chloroform. The dried chloroform extracts, on evaporation, gave a yellow oil. This was boiled with 10 parts by volume of ethanol containing 0.5 parts of hydrochloric acid for 10 minutes. The ethanolic solution on evaporation gave 0.7 parts of crude chromone ester. This solid in chloroform was washed with sodium bicarbonate solution. The dried chloroform extracts on evaporation gave 0.5 parts of pure chromone ester, m.p. 194°–6°C raised to 197°–8C (from ethanol).

Analysis:
Found: C, 62.62; H, 5.2%
$C_{31}H_{32}O_{12}$ requires: C, 62.38; H, 5.4% c. Bis- [2-carboxy-7-(2-hydroxypropoxy)chromon-8-yl] methane disodium salt

To 0.3 of a part of the above ester in 15 parts by volume of methanol were added 0.81 parts of volume of 1.17N methanollic sodium hydroxide solution. After the ester was completely hydrolized, the solution was evaporated to dryness and the sodium salt dissolved in water. The neutral solution was charcoaled and freeze dried to give bis- [2-carboxy-7-(2-hydroxypropoxy) chromon-8-yl] methane disodium salt.

EXAMPLE 22

2,2-Bis-(2-carboxychromon-6-yl) propane disodium salt

To a stirred solution of sodium ethoxide, prepared from 2.3 parts of sodium and 100 parts of ethanol, were added 11.4 parts of 2,2-bis-(p-hydroxyphenyl) propane. The solution was then evaporated leaving the sodium salt of the phenol as a white solid. This was suspended in 250 parts of refluxing dry dioxan and to it were added 20.65 parts of diethyl chlorofumarate. Refluxing was continued for 1 hour, the mixture was kept at room temperature for 18 hours, and the dioxan was evaporated to give an oil. The oil was refluxed with 100 parts of 10 percent sodium hydroxide solution and 20 parts of ethanol for 1 hour, cooled, and extracted with ether. The aqueous layer was saturated with carbon dioxide and non-acidic material was extracted with ether. The aqueous layer was then acidified to give an oil which was triturated with 100 parts of cold concentrated sulphuric acid for 1 hour. The viscous red solution was poured into crushed ice to give an oily gum which was washed by decantation and then extracted with a warm solution of sodium hydrogen carbonate. This solution precipitated colorless plates on cooling, which were recrystallized from water to give 0.65 parts of 2,2-bis-(2-carboxychromon-6-yl) propane disodium salt tetrahydrate, as colorless plates.

Analysis:
Found: C, 51.2; H, 4.24%
$C_{23}H_{14}O_8Na_2 \cdot 4H_2O$ requires: C, 51.5; H, 4.1%

EXAMPLE 23 a. Bis-(2-ethoxycarbonylchromon-6-yl) ketone

An intimate mixture of 5 parts of 4,4'-diacetoxybenzophenone and 20 parts of anhydrous aluminum chloride was heated to 170°–180° C. over a period of 20 minutes, and maintained at that temperature for a further 45 minutes. The cooled product was hydrolized with 100 parts of water containing 5 parts of concentrated hydrochloric acid.

The precipitated solid was filtered off, washed with 3 × 50 parts of water, and recrystallized from a boiling mixture of 120 parts of ethanol and 40 parts of acetone to give 3.1 parts of 3,3'-diacetyl-4,4'-dihydroxybenzophenone as a grey solid, m.p. 174°–176°C.

To a stirred suspension of 3 parts of 3,3'-diacetyl-4,4'-dihydroxybenzophenone in 15 parts of diethyl oxalate, 30 parts of ethyl alcohol and 15 parts of ether, was added a solution of 1.5 parts of sodium in 20 parts of ethyl alcohol. The mixture was stirred and heated under reflux for 2 hours.

Five-hundred parts of ether were then added, and the precipitated solid was filtered off, washed with 2 × 100 parts of ether, and dried. This solid was dissolved in 250 parts of water, and the acidified solution was extracted twice with 100 parts of chloroform. The combined extracts were dried over sodium sulphate, and evaporated to dryness to leave a brown oil.

This oil was dissolved in 10 parts of boiling ethyl alcohol, and 0.1 parts of concentrated hydrochloric acid were added. The mixture was heated under reflux for 30 minutes to give 1.9 parts of bis-(2-ethoxycarbonylchromon-6-yl) ketone as a white solid, m.p. 218°–20°C.

Analysis:
Found: C, 64.2; H, 3.77%
$C_{25}H_{18}O_9$ requires: C, 64.8; H, 3.89% b. Bis-(2-carboxychromon-6-yl) ketone disodium salt

To a refluxing suspension of 0.302 parts of bis-(2-ethoxycarbonylchromon-6-yl) ketone in 5 parts of ethyl alcohol and 5 parts of water was added a solution of 0.0523 parts of sodium hydroxide in 1.3 parts of water. The mixture was stirred and heated under reflux for 30 minutes and then 150 parts of ethanol were added. The precipitated solid was isolated, dissolved in water, charcoaled, and reprecipitated with an equal volume of ethyl alcohol to give 0.1 parts of bis-(2-carboxychromon-6-yl) ketone, disodium salt, dihydrate, as a pale yellow solid.

Analysis:
|  | Found: |  |
|---|---|---|
| $C_{21}H_8Na_2 \cdot 2H_2O$ requires: | C, 51.6; H, 2.50% |  |
|  | C, 51.8; 2.48% |  |

EXAMPLE 24

Bis-(2-carboxy-7-methoxychromony-8-yl) methane sesquihydrate a. Bis-(3-acetyl-2-hydroxy-6-methoxyphenyl) methane A mixture of 1 part of bis-(3-acetyl-2, 6-dihydroxyphenyl) methane, 8 parts of methyl iodide and 2 parts of powdered potassium carbonate was heated under reflux in 25 parts by volume of acetone for 16 hours. The acetone solution was evaporated and water was added to the solid residue. The crude insoluble product was filtered off and washed with ether to give 0.8 parts of bis-(3-acetyl-2-hydroxy-6-methoxyphenyl) methane, m.p. 247°–9°C after crystallization from acetone.

Analysis:
|  | Found: | C, 66.5; H, 5.7% |
|---|---|---|
| $C_{19}H_{20}O_6$ requires: |  | C, 66.3; H, 5.8% | b. Bis-(2-carboxy-7-methoxychromon-8-yl) methane and Bis-(2-ethoxycarbonyl-7-methoxychromon-8-yl) methane A solution of 1.5 parts of bis-(3-acetyl-2-hydroxy-6-methoxy-phenyl) methane in 4 parts of diethyl oxalate was added to a solution of 1 part of sodium in 30 parts by volume of ethanol. The yellow mixture was refluxed for 4 hours. It was then poured into 300 parts by volume of ether and the product was extracted with water (A). Some of the product, insoluble in water, was filtered off. This solid was boiled with about 10 parts of ethanol containing a catalytic amount of hydrochloric acid for 10 minutes. The filtered solution on cooling gave a white solid which was found to be mainly bis-(2-ethoxycarbonyl-7-methoxy-chromon-8-yl) methane together with some of the corresponding bis-chromone acid. The solid was dissolved in chloroform and this solution was washed with sodium bicarbonate solution. The dried chloroform extracts on evaporation gave 0.1 parts of bis-(2-ethoxycarbonyl-7-methoxychromon-8-yl) methane, m.p. 225°–226°C.

Analysis:
|  | Found: | C, 64.0; H, 4.8% |
|---|---|---|
| $C_{27}H_{24}O_{10}$ requires: |  | C, 63.8; H, 4.75% |

The aqueous extracts (A) were acidified and the products were extracted into chloroform. The dried chloroform extracts on evaporation gave an oil. This was boiled with 10 parts of ethanol containing 0.5 parts of hydrochloric acid for 10 minutes. The solution was cooled and filtered to give 0.85 parts of bis-(2-carboxy-7-methoxychromon-8-yl) methane sesquihydrate, m.pt.>250°C.

Analysis:
|  | Found: | C, 57.7; H, 4.3% |
|---|---|---|
| $C_{23}H_{16}O_{10} \cdot 1\frac{1}{2}H_2O$ requires: |  | C, 57.6; H, 4.0% |

This acid was dissolved in water containing an equivalent amount of sodium bicarbonate and freeze dried to obtain the disodium salt.

EXAMPLE 25

Di-(2-carboxychromon-6-yl)amine a. N-Acetyl-3,3'-diacetyl-4,4'-dihydroxydiphenylamine An intimate mixture of 6.2 parts of N-acetyl-4,4'-diacetoxydiphenylamine and 15.6 parts of aluminum chloride was heated at 180°–5°C for 3 hours. The melt was cooled and decomposed with ice and 3 parts of concentrated hydrochloric acid to give a solid precipitate. This solid was crystallized from ethanol, with charcoaling, to give 4.0 parts of N-acetyl-3,3'-diacetyl-4,4'-dihydroxydiphenylamine as buff needles, melting point 198°–9°C.

Analysis:
|  | Found: | C, 65.2 H, 5.33 N, 4.20% |
|---|---|---|
| $C_{18}H_{17}NO_5$ requires: |  | C, 66.0 H, 5.24 N, 4.28% | b. Di(2-carboxychromon-6-yl)amine dihydrate

To a stirred solution of 2.07 parts of sodium in 50 parts of dry ethanol was added a slurry of 3.27 parts of N-acetyl-3,3'-diacetyl-4,4'-dihydroxydiphenylamine and 8.0 parts of diethyl oxalate in 50 parts of dry ethanol. The mixture was stirred and refluxed for 4 hours.

The mixture was cooled and poured into a separating funnel containing ethyl acetate and dilute hydrochloric acid. The ethyl acetate layer was separated and evaporated to dryness to leave a brown oil. This oil was dissolved in ethanol containing 1.0 parts of concentrated hydrochloric acid and the solution was refluxed for 20 minutes.

The solvent was evaporated to leave a red oil which was hydrolyzed with sodium bicarbonate in aqueous ethanol. When hydrolysis was complete the solution was cooled and acidified with dilute hydrochloric acid to give a brown sticky precipitate.

The supernatant liquid was poured off and the precipitate was boiled with ethanol to leave di-(2-carboxychromon-6-yl)amine dihydrate as a reddish brown solid, melting point 303°–5C(d). More of this material crystallized from the ethanol washings to give a total yield of 0.15 parts.

Analysis:
|  | Found: | C, 55.35 H, 3.27, N, 3.2% |
|---|---|---|
| $C_{20}H_{11}NO_8 \cdot 2H_2O$ requires: |  | C, 55.95 H, 3.52, N, 3.26% | c. Di-(2-carboxychromon-6-yl)amine disodium salt

A solution of 0.122 parts of di-(2-carboxychromon-6-yl) amine dihydrate and 0.048 parts of sodium bicarbonate of 30 parts of water was freeze-dried to give 0.12 parts of di-(2-carboxychromon-6-yl) amine disodium salt as a yellow solid.

EXAMPLE 26

2,2'-Dicarboxy-8,8'-bichromonyl a. o-Iodophenoxyfumaric acid

To a solution of 11 parts of o-iodophenol and 7.6 parts of dimethyl acetylenedicarboxylate in 100 parts of dry dioxan was added 1 part of benzyl trimethylammonium hydroxide. The solution was heated at 100°C for 40 minutes, cooled, basified with 35 parts of 25 percent sodium hydroxide solution and heated for 2 hours at 100°C.

The mixture was then cooled, washed with diethyl ether, acidified with concentrated hydrochloric acid and extracted three times with 75 parts of diethyl ether.

The ethereal extracts were washed with water, dried over sodium sulphate and evaporated to give a pale yellow solid.

The solid was crystallized from water to give 13.5 parts of o-iodophenoxyfumaric acid m.p. 184°–7°C.

Analysis:
|  | Found: | C, 36.0; H, 2.10; I, 38.9% |
|---|---|---|
| $C_{10}H_7IO_5$ requires: |  | C, 35.9; H, 2.10; I, 38.0% | b. 2-Carboxy-8-iodo chromone

A solution of 8 parts of o-iodophenoxyfumaric acid in 40 parts of concentrated sulphuric acid was allowed to stand at room-temperature for 5 minutes. The solution was then poured on to ice to give a solid which was filtered off, washed with water, dried and crystallized from ethanol to give 3.3 parts of 2-carboxy-8-iodo chromone m.p. 277°C(d).

Analysis:

| | Found: | |
|---|---|---|
| $C_{10}H_5IO_4$ requires: | C, 38.0; | H, 1.72% |
| | C, 38.0; | H, 1.58% | c. 2-Ethoxycarbonyl-8-iodo chromone

To a solution of 3.3 parts of 2-carboxy-8-iodo chromone in 150 parts of ethanol was added 1 part of concentrated sulphuric acid. The solution was refluxed for 18 hours, cooled and evaporated to give a brown oil which was dissolved in diethyl ether. The ethereal solution was washed with water, sodium bicarbonate solution, dried and evaporated to give a pale yellow solid. The solid was crystallized from petroleum ether (boiling range 80°–100°C) to give 3.3 parts of 2-ethoxycarbonyl-8-iodo chromone m.p. 114°–5°C.

Analysis:

| | Found: | |
|---|---|---|
| $C_{12}H_9IO_4$ requires: | C, 41.9; | H, 2.47% |
| | C, 41.9; | H, 2.62% | d. 2,2'-Diethoxycarbonyl-8,8'-bichromonyl

To a solution of 3.4 parts of 2-ethoxycarbonyl-8-iodochromone in 50 parts of dimethylformamide were added 8 parts of copper-bronze. The mixture was heated at 160°C for 6 hours, and filtered whilst hot into water. The resulting solid was filtered off, washed, dried, digested in warm ethanol and filtered. It was then crystallized twice from ethanol to give 0.3 parts of 2,2'-diethoxycarbonyl-8,8'-bichromonyl m.p. 227°–9°C.

Analysis:

| | Found: | |
|---|---|---|
| $C_{24}H_{18}O_8$ requires: | C, 66.1; | H, 3.92% |
| | C, 66.4; | H, 4.15% |

The structure was confirmed by N.M.R. and Mass spectroscopy.

e. 2,2'-Dicarboxy-8,8'-bichromonyl hemihydrate

To a solution of 1.1 parts of 2,2'-diethoxycarbonyl-8,8' bichromonyl in boiling ethanol were added 0.42 parts of sodium hydrogen carbonate. Water was then added until a clear solution was obtained. The solution was boiled for 2 hours and the ethanol was evaporated off. The aqueous solution was then acidified with hydrochloric acid to give 0.8 parts of 2,2'-dicarboxy-8,8'-bichromonyl hemihydrate m.p. 319°–302°C.

Analysis:

| | Found: | |
|---|---|---|
| $C_{20}H_{10}O_8 \cdot \tfrac{1}{2}H_2O$ requires: | C, 61.6; | H, 2.67% |
| | C, 62.0; | H, 2.84% | f 2,2'-Dicarboxy-8,8'-bichromonyl disodium salt

A solution of 0.6 parts of 2,2'-dicarboxy-8,8'-bichromyl hemihydrate and 0.26 parts of sodium hydrogen carbonate in 50 parts of water was freeze dried to give 2,2'-dicarboxy-8,8'-bichromonyl disodium salt as a white solid.

EXAMPLE 27

The compounds set out in Table I were tested to assess their effectiveness in inhibiting antibody-antigen reactions.

In the antibody-antigen tests, the effectiveness of the compounds of the invention in inhibiting the passive cutaneous anaphylaxis in rats was assessed. It has been proved that this form of test gives reliable qualitative indications of the ability of the compounds under test to inhibit antibody-antigen reactions in man.

In this test method Sprague-Dawley rats (male or female) having a body weight of from 100 to 130 gms. were injected subcutaneously with about 2000 N. Braziliensis larvae per animal. After 4 weeks the rats were reinfected at weekly intervals with four further subcutaneous administrations of from 2000–12000 larvae per animal. One week after the last reinfection the rats were bled by hear puncture and 15–20 mls. of blood collected from each animal. The blood samples were centrifuged at 3500 rpm. for 30 minutes in order to remove the blood plasma from the blood cells. The blood plasma was used to provide a serum containing the worm antibody.

A pilot sensitivity test was carried out to determine the least quantity of serum required to give a skin weal in control animals in the test described below of 2 cm. diameter. It was found that with rats in the body weight range 100–130 gms, satisfactory results were obtained using a serum diluted 1:8 with physiological saline solution. The diluted solution was called antibody serum A.

The antigen to react with the antibody in serum A was prepared by removing worms from the gut of the injected rats, homogenizing the worms, centrifuging the homogenate and collecting the supernatent liquor. This liquor was diluted with water to give a protein content of 10 millegrams/ml and was known as serum B.

Sprague-Dawley rats in the body weight range 100 to 130 gms. were sensitized by intradermal injection of 0.1 mls. of serum A into the right flank. Sensitivity was allowed to develop for 24 hours and the rats were then injected intraveneously with 1 ml/100 gms. body weight of a mixture of serum B (0.25 mls), Evans Blue dye solution (0.25 mls.) and the solution of the compound under test (0.5 mls. of varying concentrations). Insoluble compounds were administered as a separate intraperitoneal injection 5 minutes before intraveous administration of serum B and Evans Blue dye. For each concentration of the compound under test five rats were injected. Five rats were used as controls in each test. The dosages of the compound under test were selected so as to give a range of inhibition values.

Thirty minutes after injection of serum B the rats were killed and the skins removed and reversed. The intensity of the anaphylactic reaction was assessed by comparing the size of the characteristic blue weal produced by spread of the Evans Blue dye from the sensitization site, with the size of the weal in the control animals. The size of the weal was rates as 0 (no weal detected, i.e. 100 percent inhibition) to 4 (no difference in size of weal, i.e. no inhibition) and the percentage inhibition for each dose level calculated as:

$$\text{Percent inhibition} = \frac{(\text{Control group score} - \text{treated group score}) \times 100}{\text{Control group score}}$$

The percentage inhibitions for the various dose levels were plotted graphically for each compound. From these graphs the dosage required to achieve a 50 percent inhibition of the anaphylactic reaction ($ID_{50}$) may be determined. These results are tabulated in Table I.

TABLE I

| Name of Compound tested (as disodium salt) | $ID_{50}$ values in mgs/Kg of the sodium salt |
|---|---|
| 2,2'-Dicarboxy-6,6'-bichromonyl | 0.17 |
| 2,2'-Dicarboxy-5,5'-dimethoxy-6,6'-bichromonyl | >10 |
| Bis-(7-benzyloxy-2-carboxychromon-6-yl) sulphide | 7.0 |
| 2,2'-Dicarboxy-5,5',7,7'-tetramethoxy-8,8'-bichromonyl | >10 |
| 2,2'-Dicarboxy-7,7'-dimethoxy-8,8'-bichromyl | 10 |
| 2,2'-Dicarboxy-6,6'-dimethoxy-5,5'-bichromyl | >10 |
| Bis-(2-carboxy-5-methoxychromon-8-yl) sulphide | >10 |
| Bis-(2-carboxychromon-6-yl) sulphide | >10 |
| Bis-(2-carboxy-7-methoxychromon-6-yl) sulphide | 8.4 |
| Bis-(2-carboxy-7-methoxychromon-6-yl) sulphone | >10 |
| 2,2'-Dicarboxy-7,7'-bichromonyl | 0.25 |
| Bis-(2-carboxychromon-6-yl) ether | 3.7 |
| Bis-(2-carboxy-5-methoxychromon-8-yl) sulphone | >10 |
| 6,6'-Dibromo-2,2'-dicarboxy-8,8'- | |

| | |
|---|---|
| bichromonyl | 6.2 |
| 2,2'-Bis-(2-carboxy chromon-6-yl)acetic acid (trisodium salt) | >10 |
| Ethyl 2,2'-bis-(2-carboxychromon-6-yl) acetate | 7 |
| 1,1'-Bis-(2-carboxychromon-6-yl)-2,2-dichloroethylene | >10 |
| Bis-(2-carboxychromon-6-yl) methane | >10 |
| Bis-(2-carboxychromon-6-yl) pyrid-2-yl methane | 10 |
| Bis-[2-carboxy-7-(2-hydroxypropoxy)chromon-8-yl] methane | >10 |
| 2,2'-Bis-(2-carboxychromon-6-yl) propane | 8.6 |
| Bis-(2-carboxychromon-6-yl) ketone | 3.0 |
| Bis-(2-carboxy-7-methoxychromon-8-yl) methane | 10 |
| Di-(2-carboxychromon-6-yl) amine | 0.5 |
| 2,2'-Dicarboxy-8,8'-bichromonyl | >10 |

EXAMPLE 28

The following are examples of compositions, containing the disodium salt of 2,2'-dicarboxy-6,6'-bichromonyl suitable for inhalation in the prophylactic treatment of allergic asthma.

Aerosol formulation

| | |
|---|---|
| Disodium salt | 2.0% |
| Isoprenaline sulphate | 0.1% |
| Sodium dioctylsulphosuccinate | 0.004% |
| 60:40 mixture of propellant 12 and propellant 114 | to 100% |

Propellant 12 is dichloro-difluoromethane
Propellant 114 is dichloro-tetrafluoroethane

Solid Powder Formulation

Each dosage unit contains:
| | |
|---|---|
| Disodium salt | 20 mgs. |
| Isoprenative sulphate | 0.1 mgs |
| Lactose | 15 mgs. |

We claim:
1. A compound of the formula

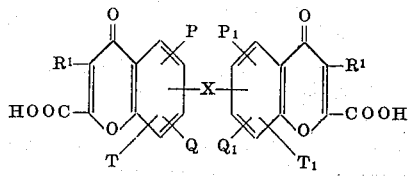

wherein P, Q, T, P₁, Q₁ and T₁, which may be the same or different, each represents hydrogen; an alkyl, alkoxy, alkenyl or alkenyloxy group, each of which groups may contain from one to eight carbon atoms and each of which groups may be substituted by a hydroxy, halogen or lower alkoxy group; amino; mono- or di-lower alkyl amino; amino-lower-alkoxy; di-lower alkylamino lower alkoxy; nitro; hydroxy; halogen or benzyloxy, X represents a carbon - carbon bond; a sulphur or oxygen atom; a group —SO—; —SO₂—; —NH—; —NR²—; where R² is lower alkyl; —C(R³)₂—, where each R³ may be the same or different and is hydrogen, hydroxy, halogen, lower alkyl, a carboxylic acid group or a lower alkyl ester thereof, or pyridyl; —CS—; or

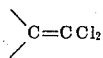

each R¹, which may be the same or different, represents hydrogen, alkyl containing from one to ten carbon atoms, alkoxy containing from one to ten carbon atoms or phenyl.

2. A compound according to claim 1, wherein X is a carbon-carbon bond; a sulphur or oxygen atom, or a group —CH₂—, —CHOH—, —C(R⁴)₂—, —CO—, —CH(COOH)—, —CH(COOR⁴)—,

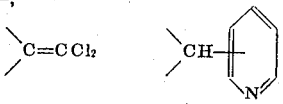

—NH—, —SO— or —SO₂ —, and R⁴ represents a lower alkyl group.

3. A compound according to claim 1, wherein both R¹ groups are hydrogen.

4. A compound according to claim 1, wherein X is a carbon - carbon bond or an —NH— group, which bond or group links the 6,6' positions of the chromone nuclei.

5. A compound according to claim 1, wherein —X— links the same positions on each chromone nucleus and is a carbon - carbon bond, a sulphur or oxygen atom, or a group —SO₂—, —CH(COOH)—, —CH(COOC₂H₅)—,

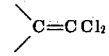

—CH₂—,

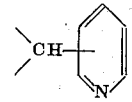

, —C(CH₃)₂, —CO— or —NH—,

P, Q, T, P₁, Q₁ and T₁, which may be the same or different, are each hydrogen, methoxy, benzyloxy, bromine or hydroxypropoxy, and each R¹ is hydrogen.

6. A compound according to claim 1 in the form of a pharmaceutically acceptable salt thereof.

7. A compound according to claim 6 wherein the salt is selected from salts having an alkaline earth, alkali-metal, piperidinium, pyridinium or mono- di- or tri-lower alkyl or lower alkanol ammonium cation, or the ammonium cation.

8. A compound according to claim 7, wherein the salt is the sodium salt.

9. A compound according to claim 5 in the form of a pharmaceutically acceptable salt thereof.

10. A compound according to claim 1 which is 2,2'-dicarboxy 6,6'-bichromonyl.

11. A compound according to claim 1 which is 2,2'-dicarboxy-5,5'-dimethoxy-6,6'-bichromonyl.

12. A compound according to claim 1 which is bis-(7-benzyloxy-2-carboxychromon-6-yl)sulphide.

13. A compound according to claim 1 which is 2,2'-dicarboxy-5,5', 7,7'-tetramethoxy-8,8'-bichromonyl.

14. A compound according to claim 1 which is 2,2'-dicarboxy-7,7'-dimethoxy-8,8'-bichromonyl.

15. A compound according to claim 1 which is 2,2'-dicarboxy-6,6'-dimethoxy-5,5'-bichromonyl.

16. A compound according to claim 1 which is bis-(2-carboxy-5-methoxychromon-8-yl)sulphide.

17. A compound according to claim 1 which is bis-(2-carboxychromon-6-yl)sulphide.

18. A compound according to claim 1 which is bis-(2-carboxy-7-methoxychromon-6-yl)sulphide.

19. A compound according to claim 1 which is bis-(2-carboxy-7-methoxychromon-6-yl)sulphone.

20. A compound according to claim 1 which is 2,2'-dicarboxy-7,7'-bichromonyl.

21. A compound according to claim 1 which is bis-(2-carboxychromon-6-yl)ether.

22. A compound according to claim 1 which is bis-(2-carboxy-5-methoxychromon-8-yl)sulphone.

23. A compound according to claim 1 which is 6,6'-dibromo-2,2'-dicarboxy-8,8'-bichromonyl.

24. A compound according to claim 1 which is 2,2'-bis-(2-carbocychromon-6-yl) acetic acid.

25. A compound according to claim 1 which is ethyl 2,2'-bis-(2-carboxychromon-6-yl)acetate.

26. A compound according to claim 1 which is 1,1'-bis-(2-carboxychromon-6-yl)-2,2-dichloroethylene.

27. A compound according to claim 1 which is bis-(2-carboxychromon-6-yl) pyrid-2-yl methane.

28. A compound according to claim 1 which is bis-(2-carboxychromon-6-yl) methane.

29. A compound according to claim 1 which is bis-[2-carboxy-7-(2-hydroxypropoxy)chromon-8-yl] methane.

30. A compound according to claim 1 which is 2,2'-bis-(2-carboxychromon-6-yl) propane.

31. A compound according to claim 1 which is bis-(2-carboxychromon-6-yl) ketone.

32. A compound according to claim 1 which is bis-(2-carboxychromon-8-yl) methane.

33. A compound according to claim 1 which is di-(2-carboxychromon-6-yl) amine.

34. A compound according to claim 1 which is 2,2'-dicarboxy-8,8'-bichromonyl.

* * * * *